United States Patent [19]
Kishimoto et al.

[11] Patent Number: 5,543,381
[45] Date of Patent: Aug. 6, 1996

[54] REWRITABLE RECORDING MEDIUM AND A METHOD OF RECORDING IN THE SAME

[75] Inventors: Yoshio Kishimoto; Masaaki Suzuki, both of Hirakata, Japan

[73] Assignee: Matsushita Electric Industrial Co., Ltd., Osaka, Japan

[21] Appl. No.: 222,778

[22] Filed: Apr. 4, 1994

Related U.S. Application Data

[63] Continuation of Ser. No. 936,413, Aug. 27, 1992, Pat. No. 5,364,829.

[30] Foreign Application Priority Data

Aug. 30, 1991 [JP] Japan .................................. 3-219536
Aug. 30, 1991 [JP] Japan .................................. 3-219537

[51] Int. Cl.$^6$ ........................... B41M 5/34; B41M 5/40
[52] U.S. Cl. .................... 503/201; 428/195; 428/207; 428/913; 503/226; 430/200; 430/945
[58] Field of Search ................... 503/201, 226; 428/195, 207, 913; 430/200, 945

[56] References Cited

U.S. PATENT DOCUMENTS

| | | | |
|---|---|---|---|
| 2,668,126 | 2/1954 | Taylor et al. ........................ | 117/36 |
| 4,268,413 | 5/1981 | Dabisch ............................... | 252/408 |
| 4,837,071 | 6/1989 | Tagoku et al. ........................ | 428/195 |

FOREIGN PATENT DOCUMENTS

| | | | |
|---|---|---|---|
| 2482756 | 11/1981 | France | B41M 5/34 |
| 54-119377 | 9/1979 | Japan | B41M 5/34 |
| 57-82088 | 5/1982 | Japan | B41M 5/34 |
| 57-82087 | 5/1982 | Japan | B41M 5/34 |
| 64-26493 | 1/1989 | Japan | B41M 5/34 |
| 64-78880 | 3/1989 | Japan | B41M 5/34 |
| 63-29795 | 1/1990 | Japan | B41M 5/34 |
| 2079031 | 1/1982 | United Kingdom | B41M 5/34 |
| 0429010 | 5/1991 | WIPO | B41M 5/34 |

*Primary Examiner*—Pamela R. Schwartz
*Attorney, Agent, or Firm*—Panitch Schwarze Jacobs & Nadel, P.C.

[57] ABSTRACT

A rewritable recording medium which can perform multi-color recording is provided. The recording medium comprises an optical absorption layer and an optically selective absorption layer sequentially stacked on a substrate, wherein the optically selective absorption layer includes a plurality of colored segments and a reversible thermosensitive recording matrix in contact with the colored segments, the reversible thermosensitive recording matrix being formed so as to cover the colored segments and so as to come in contact with the optical absorption layer, and changing in light transmittance in a reversible manner by application of heat.

14 Claims, 5 Drawing Sheets

REWRITABLE RECORDING MEDIUM AND A METHOD OF RECORDING IN THE SAME

CROSS REFERENCE TO RELATED APPLICATION

This is a continuation of application Ser. No. 07/936,413, filed Aug. 27, 1992 now U.S. Pat. No. 5,364,829.

BACKGROUND OF THE INVENTION

1. Field of the Invention:

The present invention relates to a recording medium capable of recording information and erasing the recorded information in a reversible manner by application of heat or by irradiation with light. By the use of this recording medium according to the present invention, monochrome and multicolor recording can be performed. The medium can be used particularly as an optical recording medium, and applied to a rewritable color recording sheet for a color copying machine, a color printer, and a facsimile, and a rewritable memory card having a display function.

2. Description of the Prior Art:

As recording materials for use in a rewritable recording medium, there are two kinds of materials as follows: materials in photon mode such as photochromic materials which change in color in a reversible manner by irradiation with light; and thermosensitive recording materials which histably change in phase in a reversible manner on heating and cooling. As the latter materials, phase change type recording materials, photomagnetic recording materials, and the like are well known which transform light energy into thermal energy based on their light absorption properties to conduct recording.

Organic materials are widely used for the thermosensitive recording materials. Examples of these materials include (i) thermosensitive dye type recording materials which comprise a leuco dye, a coloring agent, and an agent for erasing a color in combination, and which reversibly develop and erase a color; (ii) phase change type thermosensitive recording materials comprising a matrix polymer and organic crystalline microparticles dispersed therein, the microparticles changing in transparency depending upon the solidifying conditions determined in response to the heating and cooling process of the matrix containing the microparticles; and (iii) thermosensitive recording materials comprising a liquid crystal polymer such as a cholesteric liquid crystal, the transparency of the recording material being changed by changing the molecular orientation of the polymer by application of heat.

Among the thermosensitive recording materials mentioned above, the materials of type ii which comprise a matrix polymer and organic crystalline microparticles therein as mentioned above have attracted attention. In this type of materials, information is recorded and erased in a reversible manner based on a change in transparency of the recording material depending on the solidifying conditions of the microparticles. That is, when the above-mentioned organic crystalline microparticles are melted by application of heat, and then solidified by lowering the temperature, the microparticles achieve various types of solidified states such as a polycrystalline state, a single crystalline state, an amorphous state, or a non-crystalline state, according to the melting and solidifying conditions. Each state has different transparency characteristics. Thus, the recording and erasing of information is accomplished by utilizing this phenomenon.

For example, as shown in FIG. 8b, a sheet made of a transparent matrix polymer 310 comprising organic crystalline microparticles in a polycrystalline state 311B is opaque as a whole at ordinary temperature since the organic crystalline microparticles scatter light. As shown in FIG. 9, when this polymer sheet is gradually heated and the temperature exceeds $T_0$ (which is approximately equal to the glass transition point (Tg) of the matrix polymer), the polymer sheet begins to change from an opaque state to a transparent state. When the temperature reaches $T_1$, the polymer sheet becomes almost completely transparent. At this point, the organic crystalline microparticles 311A (see FIG. 8a) are light transmissible. When the temperature is raised further to $T_2$ or more, the light transmittance of the organic crystalline microparticles gradually decreases, and the polymer sheet becomes semi-transparent at $T_3$ (approximately corresponding to the melting point of the organic crystalline microparticles). When the organic crystalline microparticles that were previously heated to a temperature between and $T_2$ are cooled to room temperature, the organic crystalline microparticles are light transmissible, and thus the polymer sheet remains transparent. When the organic crystalline microparticles that were previously heated to $T_3$ or more are cooled to room temperature, the organic crystalline microparticles scatter light, and thus the polymer sheet becomes opaque. Because of this, for example, the state of the transparent sheet which has been cooled to room temperature, after having been heated to a temperature between $T_1$ and $T_2$, is made an initial state. Information is written to the sheet at a temperature of $T_3$ or more, whereby information is recorded. In the alternative, the state in which the sheet is opaque is made an initial state, and information can be written to the sheet so that the sheet becomes transparent.

Japanese Laid-Open Patent Publication No. 54-119377 discloses the combination of the above-mentioned matrix polymer and the organic crystalline microparticles. Examples of the materials for the organic crystalline microparticles disclosed therein include aliphatic and aromatic alcohols, carboxylic acids, amines, and amides, and halides and sulfides thereof. Examples of the matrix polymer disclosed therein include polyesters, polyamides, polyacrylic acid, polystyrene, silicone resins, polyvinyl chloride, polyvinylidene chloride, and polyacrylonitrile. Improved recording materials which further comprise carbon black for transforming light energy into thermal energy and which further comprises additives such as an anti-oxidant are disclosed in Japanese Laid-Open Patent Publication Nos. 57-82087 and 57-82088, respectively.

However, there has been a problem in that none of the conventional recording materials mentioned above can perform rewritable multicolor recording.

SUMMARY OF THE INVENTION

The first rewritable recording medium of this invention, comprises an optical reflection layer and an optically selective absorption layer sequentially stacked on a substrate, wherein the optically selective absorption layer includes a plurality of colored segments and a reversible thermosensitive recording matrix in contact with the colored segments, the reversible thermosensitive recording matrix being formed so as to cover the colored segments at least on the medium surface side, and changing in light transmittance in a reversible manner by application of heat.

In a preferred embodiment, the reversible thermosensitive recording matrix is made of a composition comprising organic crystalline microparticles and a transparent matrix polymer, the colored segments are a plurality of colored particles dispersed in the recording matrix made of the composition, and the organic crystalline microparticles change in crystalline state depending upon the heating and cooling process of the matrix, which changes the light transmittance of the matrix.

In a preferred embodiment, the colored segments in the optically selective absorption layer are arranged on the top surface of the optical reflection layer to form a coloring layer, and a layer of the reversible thermosensitive recording matrix is formed on the coloring layer to form a recording layer.

In a preferred embodiment, the rewritable recording medium further comprises a transparent protection layer on the optically selective absorption layer.

A second rewritable recording medium of the present invention comprises an optical absorption layer and an optically selective absorption layer sequentially stacked on a substrate, wherein the optically selective absorption layer includes a plurality of colored segments and a reversible thermosensitive recording matrix in contact with the colored segments, the reversible thermosensitive recording matrix being formed so as to cover the colored segments and so as to come in contact with the optical absorption layer, and changing in light transmittance in a reversible manner by application of heat.

In a preferred embodiment, the reversible thermosensitive recording matrix is made of a composition comprising organic crystalline microparticles and a transparent matrix polymer, the colored segments are a plurality of colored particles arranged in the matrix substantially in a single layer, and the organic crystalline microparticles change in crystalline state depending upon the heating and cooling process of the matrix, which changes the light transmittance of the matrix.

In a preferred embodiment, the optically selective absorption layer further comprises a recording layer made of the reversible thermosensitive recording matrix at the interface between the optically selective absorption layer and the optical absorption layer.

In a preferred embodiment, the optically selective absorption layer comprises a second recording layer made of the reversible thermosensitive recording matrix formed on the optical absorption layer; a coloring layer including a plurality of colored segments formed on the second recording layer, and a first recording layer made of the reversible thermosensitive recording matrix formed on the coloring layer, and the colored segments are arranged along the top surface of the second recording layer to form a coloring layer.

In a preferred embodiment, the rewritable recording medium further comprises a transparent protection layer on the optically selective absorption layer.

The present invention comprises a method of recording information in a first rewritable recording medium of the present invention which comprises an optical reflection layer and an optically selective absorption layer sequentially stacked on a substrate;

wherein the optically selective absorption layer in the recording medium includes a plurality of colored segments, end a reversible thermosensitive recording matrix in contact with the colored segments, the reversible thermosensitive recording matrix being formed so as to cover the colored segments at least on the medium surface side, and changing in light transmittance in a reversible manner with application of heat. The recording method comprises the steps of:

a) heating and cooling the reversible thermosensitive recording matrix in the optically selective absorption layer so that the matrix becomes light transmissible, b) detecting the color and position of each segment of the colored segments, and c) heating a portion of the reversible thermosensitive recording matrix which locates at the medium surface side of the desired segment in response to the information on the color and position of the segment, and an image signal to be recorded so that the portion of the reversible thermosensitive recording matrix scatters light, which masks the colored segments.

In a preferred embodiment, the colored segments in the first recording medium are a plurality of colored particles arranged in the reversible thermosensitive recording matrix substantially in a single layer, and the application of heat is conducted by means of a thermal recording head or laser beam.

In a preferred embodiment, the colored segments in the optically selective absorption layer are arranged on the top surface of the optical reflection layer to form a coloring layer, a layer of the reversible thermosensitive recording matrix is formed on the coloring layer to form a recording layer, and the application of heat is conducted by heating the recording layer by means of a thermal recording head or laser beam.

The present invention comprises a method of recording information in a second rewritable recording medium of the present invention which comprises an optical absorption layer and an optically selective absorption layer sequentially stacked on a substrate, wherein the optically selective absorption layer includes colored segments of three primary colors which are red, green, and blue, respectively, and a reversible thermosensitive recording matrix in contact with the colored segments, the reversible thermosensitive recording matrix being formed so as to cover the colored segments and so as to be in contact with the optical absorption layer, and changing in light transmittance in a reversible manner by application of heat. The method of recording comprises the steps of:

a) heating and cooling the reversible thermosensitive recording matrix in the optically selective absorption layer so that the recording matrix becomes light transmissible, and b) irradiating the colored segments with light corresponding to an color image signal, whereby the optical absorption layer absorbs the light which has passed through the colored segments to generate heat, which causes a change of the reversible thermosensitive recording matrix in contact with the optical absorption layer to scatter light, so that the color of the segments is developed due to the light scattered by the optical absorption layer; while the colored segments which has absorbed light generate heat, which causes a change of the reversible thermosensitive recording matrix in contact with the segments to scatter light, so that the segments are masked.

In a preferred embodiment, the reversible thermosensitive recording matrix is made of a composition comprising organic crystalline microparticles and a transparent matrix polymer, the colored segments are a plurality of colored particles arranged in the matrix made of the composition substantially in a single layer, and the organic crystalline microparticles change in crystalline state due to the generation of heat of the optical absorption layer or the colored particles, which causes a change of the recording matrix in contact with the optical absorption layer or the colored particles to scatter light.

In a preferred embodiment, the optically selective absorption layer further comprises a recording layer made of the reversible thermosensitive recording matrix at the interface between the optically selective absorption layer and the optical absorption layer.

In a preferred embodiment, the optically selective absorption layer comprises a second recording layer made of the reversible thermosensitive recording matrix formed on the optical absorption layer; a coloring layer including a plurality of colored segments formed on the second recording layer, and a first recording layer made of the reversible thermosensitive recording matrix formed on the coloring layer, the colored segments are arranged along the top surface of the second recording layer to form a coloring layer, and the color of the colored segments is developed by a light reflection of the second recording layer in a light scattering state, while the colored segments absorbing the light are masked by the first recording layer in a light scattering state.

Thus, the invention described herein makes possible the advantages of (1) providing a recording medium which can record and erase information in a reversible manner by application of heat or by irradiation with light, and which can perform monochrome or multicolor recording; (2) providing a recording medium made of a recording material comprising a thermosensitive recording material and colored segments therein, the thermosensitive recording material being made of a transparent matrix polymer and organic crystalline microparticles, which can perform monochrome or multicolor recording by changing the light transmittance of the thermosensitive recording material by application of heat or by irradiation with light; (3) providing a recording medium which has the above-mentioned excellent characteristics and which can be used for a recording sheet for a color copying machine, a facsimile, and various printers, a card with a display function, etc.; and (4) providing a method for readily performing monochrome or multicolor recording by application of heat or by irradiation with light in the above-mentioned recording medium. dr These and other advantages of the present invention will become apparent to those skilled in the art upon reading and understanding the following detailed description with reference to the accompanying figures.

BRIEF DESCRIPTION OF THE DRAWINGS

FIG. 2a illustrates organic crystalline layer 301A in a transparent crystalline state close to the surface of the colored particle 31. FIG. 2b shows organic crystalline layer 301B in a opaque crystalline state close to the surface of the colored particle 31.

DESCRIPTION OF THE PREFERRED EMBODIMENTS

Figure 1A:
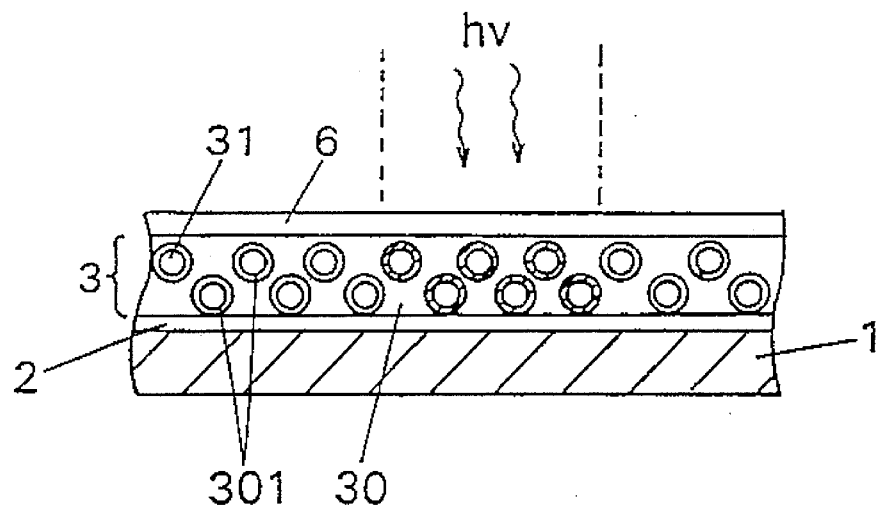
FIGS. 1a and 1b are sectional views schematically illustrating an example of a rewritable recording medium of this invention, respectively, which comprises an optical reflection layer and an optically selective absorption layer sequentially stacked on a substrate.

As a reversible thermosensitive recording matrix for use in a recording medium of the present invention, used are reversible thermosensitive recording materials of various types as follows.

1) A recording material comprising a recording matrix made of a composition having a transparent matrix polymer and organic crystalline microparticles. When the recording matrix made of this composition is heated and cooled, the organic crystalline microparticles in the matrix are melted and solidified, which changes the crystalline state of the microparticles depending upon the heating and cooling process. This causes the microparticles to be light transmissible or to scatter light.

2) A recording material made of a crystalline polymer. The crystalline polymer is melted and crystallized on heating and cooling, during which the particle size of the crystalline polymer varies with the solidifying conditions corresponding to the heating and cooling process. When the crystalline polymer is crystallized to form crystal particles with a small size, the recording material made of the crystalline polymer appears to be transparent, while the recording material appears to be opaque when the resulting crystal particles have a large size.

3) A recording material made of a phase changeable material which changes into a crystallized state or into an amorphous state on heating and cooling depending upon the heating and cooling process. The phase changeable material in a crystallized state scatters light, and thus the recording material appears to be opaque, while the phase changeable material in an amorphous state is light transmissible, and thus the recording material appears to be transparent.

4) A recording material made of a composition comprising two or more components. Since each component has a different melting point, the composition changes into a miscible state or an unmiscible state on heating and cooling depending upon the temperature range which the heating and cooling process covers. When the recording material is heated to a temperature equal to, or above the melting point of each component, the composition becomes in a miscible state, and therefore, the recording material appears to be transparent. In contrast, when the recording material is heated to a temperature lower than the melting point of either component, the composition changes into an unmiscible state, and therefore the recording material appears to be opaque.

5) A recording material made of a liquid crystal polymer. The liquid crystal polymer changes in molecular orientation on heating and cooling depending upon the heating and cooling process, which makes the recording material made of the liquid crystal polymer transparent or opaque.

The reversible thermosensitive recording matrix for use in the present invention is required to have excellent transparency and opaqueness, end excellent contrast, high speed of response, and be produced at a low cost. Among the above-mentioned reversible thermosensitive recording matrixes of the types 1 to 5, the recording matrix of the type 1 (hereinafter referred to as a phase change type reversible thermosensitive recording matrix) is preferable in terms of these requirements. The phase change type reversible thermosensitive recording matrix will now be described below, but the reversible thermosensitive recording matrix for use in the recording medium of the present invention is not limited to this phase change type one, and even among the recording matrixes of types 2 to 5 mentioned above, any recording matrixes which change into a transparent state or an opaque state in a reversible manner on heating and cooling have the same principles upon which they perform recording, and therefore can be used for the present invention.

The phase change type reversible thermosensitive recording matrix mentioned above comprises a matrix made of a composition having organic crystalline microparticles and a transparent matrix polymer. As the transparent matrix polymer, a polymer is used which interacts with the organic crystalline microparticles mentioned below and which influences the behavior of the organic crystalline microparticles in their crystallization. When this composition is heated, the conditions of boundaries of organic crystalline microparticles contact with the polymer can be varied. It is preferred that this polymer be transparent and colorless. Examples of suitable transparent matrix polymers include transparent polymers such as polyesters, polyacrylates, vinyl chloride-vinyl acetate copolymers, cellulose acetate, polyvinyl butyral, polystyrene, and styrene-butadiene copolymers. The polymer having a group capable of forming a hydrogen bond is preferable. When the polymer has a group capable of forming a hydrogen bond, the organic crystalline particles tend to be miscible with the polymer. Adhesive polyesters having a hydroxyl group, partially saponified vinyl acetate-vinyl chloride copolymers, polyamides, polyurethanes, thermoplastic phenol resins, vinyl alcohol copolymers, acrylic acid copolymers, acrylamide copolymers, maleic acid copolymers, and the like are preferred.

Among the above transparent matrix polymers, as to the copolymers having vinyl chloride repeating units and vinyl acetate repeating units, when the reversible thermosensitive recording matrix to be obtained is heated, a temperature at which organic crystalline microparticles dispersed therein become light transmissible and the width of the temperature range in which the microparticles are light transmissible can be regulated in accordance with the difference of a ratio of the above-mentioned units in the copolymer. Moreover, a vinyl acetate component is partially saponified to form vinyl alcohol units, resulting in a copolymer having three components including vinyl chloride, vinyl acetate, end vinyl alcohol. Thus, the proportion of a group capable of forming a hydrogen bond of the transparent matrix polymer is regulated, whereby the above-mentioned temperature (i.e., a recording temperature) and the width of the temperature range can be regulated.

The organic crystalline microparticles used in the present invention are microparticles made of colorless material with a low molecular weight, and selected are materials which tend to be readily crystallized by the above matrix polymer. Preferably, it is made of a compound having a group capable of forming a hydrogen bond. Examples of the group capable of forming a hydrogen bond includes a carboxyl group, a hydroxyl group, an amino group, an amide group, etc. The above-mentioned compound preferably has at least one of these groups.

It is preferred that the organic crystalline microparticles have a melting point in the range of 60° C. to 120° C. When the organic crystalline microparticle has a melting point within this range, information can be recorded and erased with relatively low heat energy or light intensity.

Examples of the compound which can be a material for the organic crystalline microparticles include alkanols, alkanediols, alkylamines, alkylenediamines, mono- or dicarboxylic acids, amides, and sulfides and halides thereof. These compounds can be used alone or in combination of two or more thereof. Moreover, these compounds are mixed together with other compounds such as higher alcohols, aliphatic acids, alkylamines, hydroxycarboxylic acids, dicarboxylic acids, diamines, and alkylene glycols to form an eutectic crystal or a complex, whereby crystalline microparticles having a melting point of 60° C. to 120° C. can be formed. The number of carbon atoms of the above-mentioned higher alcohols, aliphatic acids, and the like which can form an eutectic crystal or a complex is preferably 10 to 30. Among such compounds, examples of the aliphatic acids include lauric acid, dodecanoic acid, myristic acid, pentadecanoic acid, palmitic acid, heptadecanoic acid, stearic acid, nonadecanoic acid, arachic acid, behenic acid, and oleic acid.. Examples of the higher alcohols include hexadecyl alcohol, heptadecyl alcohol, octadecyl alcohol, eicosanol, and docosanol.

As especially preferred materials for the organic crystalline microparticles according to the present invention, there are (i) hydroxycarboxylic acids or derivatives thereof; (ii) aliphatic amides or aliphatic ureas; (iii) a mixture of an aliphatic dicarboxylic acid and at least one aliphatic compound having an amide group or a urea group selected from the group consisting of saturated aliphatic monoamides, saturated aliphatic bisamides, and hydrocarbon-substituted ureas; and (iv) a mixture of a dicarboxylic acid and an aliphatic straight-chain compound having a group capable of forming a hydrogen bond.

The hydroxycarboxylic acid which is a first material for the organic crystalline microparticles is also called a hydroxy acid, and has at least one hydroxyl group and at least one carboxyl group in its molecule, each group being capable of forming a hydrogen bond. As the hydroxycarboxylic acid, compounds represented by the following Formulas Ia–Ie are especially preferred:

wherein $m_1$ and $n_1$ are respectively integers, and the total of $m_1$ and $n_1$ is 6 to 24;

$$HO\text{—}Ph\text{—}(CH_2)_{n_2}\text{—}COOH \quad (Ib)$$

wherein Ph is a phenylene group, and $n_2$ is an integer in the range of 0 to 18;

$$HO\text{—}Ph\text{—}COO(CH_2)_{n_3}\text{—}COOH \quad (Ic)$$

wherein Ph is a phenylene group, and $n_3$ is an integer in the range of 1 to 18.

$$HO\text{—}Ph\text{—}OCO(CH_2)_{n_4}\text{—}COOH \quad (Id)$$

wherein Ph is a phenylene group, and $n_4$ is an integer in the range of i to 18; and $$HO\text{—}Ph\text{—}COO(CH_2)_{n_5}\text{—}H \quad (Ie)$$

wherein Ph is a phenylene group, and $n_5$ is an integer in the range of 1 to 18.

The compound represented by Formula Ia is a hydroxyalkylcarboxylic acid. The compound represented by Formula Ib is an alkylphenol in which the alkyl group is carboxylated, the position of the carboxyl group being arbitrary. The compound represented by Formula Ic is an ester of hydroxybenzoic acid and a hydroxyalkylcarboxylic acid. The compound represented by Formula Id is an ester of hydroquinone and an alkylenedicarboxylic acid. The compound represented by Formula Ie is a hydroxybenzoic ester.

Examples of such hydroxycarboxylic acids include gallic acid, mandelic acid, tropic acid, malic acid, tartaric acid, and citric acid, and their derivatives.

The aliphatic amide compound which is a second material for the organic crystalline microparticles is represented by the following Formulas IIa, IIb, or IIc:

$$R^1\text{—}CONH\text{—}R^2 \quad (IIa)$$

wherein $R^1$ is a straight chain hydrocarbon group having 1 to 25 carbon atoms, $R^2$ is hydrogen, a straight chain hydrocarbon group having 1 to 26 carbon atoms, or a methylol group, and at least one of $R^1$ and $R^2$ is a straight chain hydrocarbon group having at least 10 carbon atoms;

$$R^3\text{—}CONH\text{—}(CH_2)_{n_6}\text{—}NHCO\text{—}R^3 \quad (XXb)$$

wherein $R^3$ is a straight chain hydrocarbon group having 10 to 25 carbon atoms, and $n_6$ is an integer of 1 to 8;

$$R^4\text{—}NHCO\text{—}(CH_2)_{n_7}\text{—}CONH\text{—}R^4 \quad (IIc)$$

wherein $R^4$ is a straight chain hydrocarbon group having 10 to 25 carbon atoms, and $n_7$ is an integer of 1 to 8.

The aliphatic urea, which is also a second material for the organic crystal particles, is represented by the following Formula III:

$$R^5\text{—}NHCONH\text{—}R^6 \quad (III)$$

wherein $R^5$ and $R^6$ are independently hydrogen or a straight chain hydrocarbon group having 1 to 26 carbon atoms, and at least one of $R^5$ and $R^6$ is a straight chain hydrocarbon group having at least 10 carbon atoms.

A mixture, which is obtained by adding at least one compound selected from the group consisting of higher alcohols, aliphatic acids, alkylamines, dicarboxylic acids, alkylenediols, alkylenediamines, alkylene glycols, hydroxycarboxylic acids, derivatives of alkyl benzoate, carboxyalkylphenols, aminoalkylphenols, and aminoalkyl alcohols to the above-mentioned aliphatic amide or the aliphatic urea compound, exhibits excellent characteristics.

A third material for the organic crystalline microparticles is a mixture of an aliphatic dicarboxylic acid and an aliphatic compound containing an amide group or a urea group. The aliphatic dicarboxylic acid used in the present invention is $HOOC(CH_2)_{n_8}COOH$ (wherein $n_8$ is an integer in the range of 14 to 24). The aliphatic compound containing an amide group or a urea group includes saturated aliphatic monoamides having a hydrocarbon group with at least 12 carbon atoms, saturated aliphatic biscarboxamides having a hydrocarbon group with at least 12 carbon atoms, or ureas substituted by a hydrocarbon group with at least 12 carbon atoms. Examples of the saturated aliphatic monocarboxamides include lauramide, palmit-amide, stearamide, behenamide, hydroxystearamide, N-stearylstearamide, N-stearyloleamide, oleylstearamide, methylolstearamide, and methylolbehenamide. Examples of the saturated aliphatic bisamide include methylenebisstearamide, ethylenebislauramide, ethylenebisstearamide, ethyl-enebishydroxystearamide, hexamethylenebisstearamide, N,N'-distearyladipamide, m-xylenebisstearamide, and N,N'-distearylisophthalamide. Examples of the urea substituted by a hydrocarbon group include N,N'-distearylurea, stearyl urea, xylenebisstearylurea, and diphenylmethanebisstearylurea.

The aliphatic compound having an amide group or a urea group has a hydrocarbon chain with almost the same length as that of the aliphatic dicarboxylic acid. When a mixture of this compound and the aliphatic dicarboxylic acid is heated, the interaction between the molecules is increased, resulting in the formation of an association or a complex, whereby a composite such as a mixed crystal and an eutectic is formed. In this way, plural forms of crystalline are formed, and the range of temperature in which the organic crystalline microparticles are light transmissible can be widened due to the difference in temperature characteristics of each form. The dicarboxylic acid and the compound having an amide group and a urea group are mixed in a ratio in the range of 60:40 to 10:90 by weight.

A fourth material for the organic crystalline microparticles is a mixture of an aliphatic dicarboxylic acid and a straight-chain aliphatic compound. The aliphatic dicarboxylic acid is represented by $HOOC(CH_2)_{n_9}COOH$ (where $n_9$ is an integer in the range of 6 to 24), and its melting point is 120° C. or more. The straight-chain aliphatic compound is a straight-chain compound having at least one group selected from a hydroxyl group, a carboxyl group, and an acid amide group, which is capable of forming a hydrogen bond, and its melting point is in the range of 50° C. to 100° C. Preferable examples of the straight-chain aliphatic compound include straight-chain saturated higher alcohols such as stearyl alcohol, eicosanol, and docosanol; unsaturated aliphatic amides such as oleamide and erucamide; and straight-chain saturated aliphatic acids such as palmitic acid, stearic acid, eicosanic acid, and behenic acid.

The above-mentioned aliphatic dicarboxylic acid is similar to that used as the third material for the organic crystalline microparticles, and it functions in a similar way. It is preferred that the number of carbon atoms of the straight-chain aliphatic compound be the same or approximately the same as that of the aliphatic dicarboxylic acid. The number of carbon atoms is preferably 12 or more. It is considered that this straight-chain aliphatic compound functions in a similar way as that of the aliphatic compound having an amide group or a urea group, and this straight-chain aliphatic compound forms a complex together with the dicarboxylic acid. As a result, in a similar way as in the third organic crystalline microparticles, microparticles for a recording material having a high melting point and a wide temperature range (20° C. or more) in which the microparticles are light transmissible can be obtained.

The dicarboxylic acid and the straight-chain aliphatic compound are mimed in a ratio in the range of 10:90 to 90:10, and preferably 30:70 to 80:20 by weight. When the aliphatic dicarboxylic acid is in an excess amount, in the same way as in the case that the aliphatic dicarboxylic acid is in an excess amount in the third organic crystal particles, high contrast cannot be obtained. In contrast, when the straight-chain aliphatic compound is in an excess amount, effects of the aliphatic dicarboxylic acid cannot be obtained, so that the range of temperature where the organic crystalline microparticles are light transmissible becomes narrow (e.g., less than 20° C.).

The particle size of the organic crystalline microparticles made of the above-mentioned first to fourth materials is 0.1 µm or less, and usually 0.01 to 2 µm. As described below, these organic crystalline microparticles dispersed in the transparent matrix polymer are obtained in the following manner. First, the above-mentioned materials and the transparent matrix polymer are dissolved in a protonic organic solvent, after which colored particles are added to the resulting solution. Then, the solution containing the colored particles is applied to a substrate in the prescribed position, followed by drying. In this way, a matrix layer containing organic crystalline microparticles dispersed in the matrix polymer and also containing the colored particles is formed.

The organic crystalline microparticles are contained in an amount in the range of 5 to 50 parts by weight for every 100 parts by weight of the transparent matrix polymer, preferably in the range of 15 to 40 parts by weight. When the content of the organic crystalline microparticles exceeds 50 parts by weight, the binding strength of each component forming the optically selective absorption layer or the recording layer is decreased and it becomes difficult to form a uniform optically selective absorption layer or recording layer. In contrast, when the content of the matrix polymer is increased, the amount of the organic crystalline microparticles is decreased, so that it becomes difficult to opacify the optically selective absorption layer or recording layer and the contrast between the recorded portion and an unrecorded portion is degraded.

A colored segment for use in the recording medium of the present invention can be a colored particle as shown in FIGS. 1a, 1b, 2a, 2b, 4, and 5. Alternatively, the recording medium can be constructed so that a plurality of colored segments are integrated to form a coloring layer as shown in FIGS. 1a, 1b, 3, 6, and 7.

When the colored segment is a colored particle, organic or inorganic materials colored with a pigment or dye can be used as a material for the colored segment. Naturally occurring colored inorganic materials can also be used. In general, a colored polymer or glass is used. As the polymer, both thermoplastic resin and thermosetting resin can be used. Among these materials, a polymer or glass is preferable, because the particle size thereof can readily be adjusted. When a polymer is used, melamine resin, acrylic resin, nylon resin, polycarbonate, polyester or the like is preferred. The colored particle can be transparent or opaque.

When the reversible thermosensitive recording matrix is made of a transparent matrix polymer and organic crystalline microparticles, the colored particle, at least the surface thereof is formed with a compound which influences the behavior of the organic crystalline microparticles in their crystallization, or facilitate the crystal growth thereof. For example, a compound having a polar group can be used. Especially, it is preferable that the colored particle, at least the surface thereof be formed with a compound having a group capable of forming a hydrogen bond. Examples of the group capable of forming a hydrogen bond include a hydroxyl group, a carboxyl group, an amino group, and an amide group.

The colored particle may have, for example, any of a spherical, disk, hexagonal, or cubic shape. The colored particle preferably has a smaller size, since the size thereof directly affects the resolution of the recorded image, but it is appropriate that the colored particle has a size of about 1 to 100 µm in terms of its production yield.

It is preferable that the colored particle is contained in the reversible thermosensitive recording matrix with a high density. This is attributable to the fact that the high content of the colored particle provide high recording density and high quality of images. The spherical particle is preferable, since it can readily be prepared, and contained in the matrix with a high density. The particle size distribution of the colored particle influences the surface configuration of the resulting optical selective absorption layer, the resolution of the recorded image, the density of the colored particle in the optically selective absorption layer, etc. A wide range of particle size distribution of the colored particles improves the surface configuration of the optically selective absorption layer and the density of the colored particles. However, when the organic crystalline microparticles are once heated to a temperature equal to, or higher than the melting point thereof, and then cooled so as to scatter light, since the degree of opacity of the microparticles is determined depending upon the energy absorbed in the colored particle, the size of the colored particles is preferably uniform to perform uniform recording with reproducibility. Therefore, the particle size distribution of the colored particles is appropriately determined in consideration of the surface configuration of the optically selective absorption layer, the reproducibility of the recorded images, and the like.

When a plurality of colored segments are integrated to form a coloring layer, these segments are formed in a desired configuration. The colored segments are preferably formed in such a pattern as to enable the detection of each color and position of segments colored in a plurality of colors, and easy processing of the detected signals, so that information can promptly be recorded and erased. The colored segments are formed preferably, for example, in stripes, mosaic, or dot matrix.

Such a coloring layer can be formed by conventional processes as follows: a process wherein a colored polymer is dissolved in a solvent, after which the resulting solution is printed in a desired configuration by means of a screen printing process, a gravure printing, etc.; a process wherein a printed matrix which can be colored easily such as gelatin is colored in a plurality of hues successively; a photoprocess method wherein photo-resists in a plurality of colors are successively printed, followed by exposure and development of the pattern thereof, these steps being repeated; and an electrodeposition process wherein a coloring matter charged in an electrolyte is subjected to electrodeposition. The colored segments forming the coloring layer preferably have a smaller size so as to provide higher resolution as in the case of the colored particles mentioned above. Typically, by the use of the processes mentioned above, for example, colored segments are formed in stripes with a pitch of several tens micrometers.

Nonexclusive examples of a material for a substrate used in the recording medium of the present invention include glass, a polymer, and metal. Examples of the polymer include polyester resin, polycarbonate resin, and acrylic resin. Examples of the metal include aluminum, and stainless steel. A sheet made of these metal materials with high reflectance, a sheet deposited with these metal materials, and a laminate of a film made of these metal materials and a film made of the other materials are useful for a recording medium including a reflection layer mentioned below.

The recording medium according to the present invention does not necessarily require a protection layer. However, it is generally provided in order to protect the surface of the optically selective absorption layer or a recording layer formed thereon against a scratch or dust, and which is preferably formed when the recording medium is put into practical use.

As this protection layer, any transparent films can be used which have the appropriate strength and rigidity for supporting the optically selective absorption layer or the recording layer formed thereon, and which has abrasion resistance. The presence of a protection layer with abrasion resistance in the recording medium can decrease the deterioration of the recording layer in the recording medium with time due to contact with a thermal recording head, and impart durability against repeated use thereof to the recording medium. When recording is performed by irradiation with light, the protection layer can prevent the surface of the optically selective absorption layer or the recording layer formed thereon from scattering light due to scratches or the like.

Examples of materials for the protection layer, include polyethylene terephthalate, polymers containing fluorine, polysulfones, polyethylene naphthalate, polyphenylenesulfide, polyarylates, polyimides, and polyamides. When a thermal recording head is used for recording, the thickness of the protective layer should be determined so that the heat for recording and erasing information, which is generated by means of a thermal recording head, is transmitted to the recording layer. Generally, the thickness of the protection layer is in the range of about 0.001 to 0.05 mm.

Figure 1B:
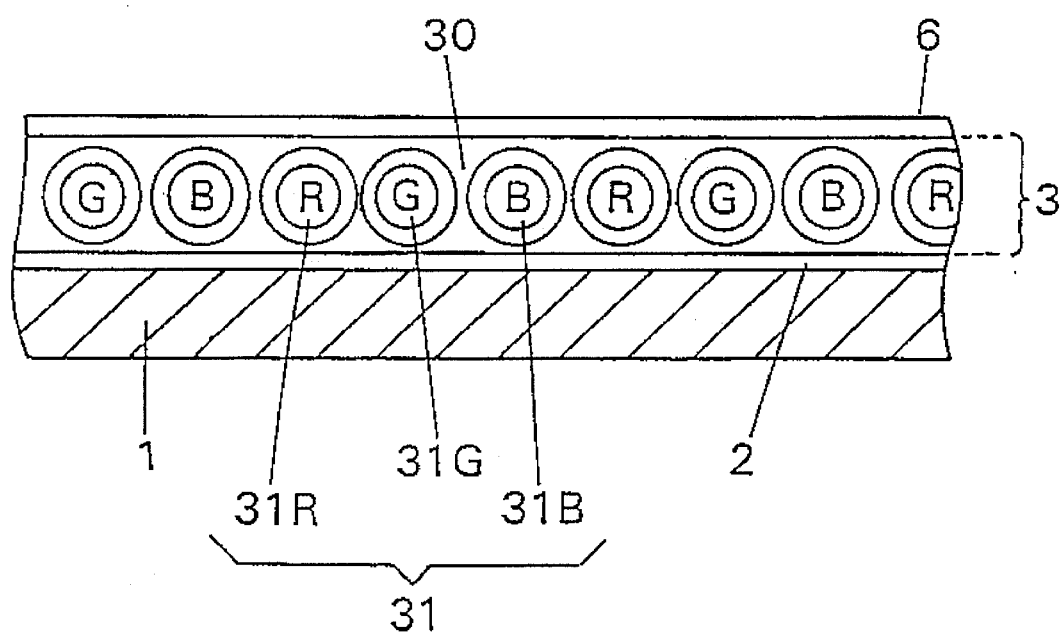

A first reversible thermosensitive recording medium of the present invention is a rewritable recording medium which has an optical reflection layer 2 and an optically selective absorption layer 3 or 4 sequentially stacked on a substrate 1 as shown in FIGS. 1a, 1b, end 3. The optically selective absorption layer 3 or 4 includes a plurality of colored segments 31 or 41, and a reversible thermosensitive recording matrix 30 in contact therewith, and the recording matrix is formed so as to cover the colored segments 31 or 41 at least on the medium surface side.

This recording medium can be roughly classified into two types. One is a recording medium wherein as a colored segment, a plurality of colored particles are dispersed in a reversible thermosensitive recording matrix 30 (hereinafter referred to as "a thermosensitive recording matrix") as shown in FIGS. 1a and 1b. This recording medium can be obtained in the following manner. For example, as shown in FIG. 1a, a reflection layer 2 is formed on a substrate 1, on which an optically selective absorption layer 3 and a protection layer 6 are sequentially stacked. The reflection layer 2 is formed by depositing metal on the substrate 1 or by laminating metal foil to the substrate 1. Alternatively, the reflection layer 2 can be formed by laminating an opacified polymer sheet on a substrate. The optically selective absorption layer 3 is formed in the following manner. First, one of the above-mentioned materials i to iv capable of forming organic crystalline microparticles, and a transparent matrix polymer are dissolved in an organic solvent. Then, to this solution are added colored particles, and if required, a crystal core agent, an antioxidant, an ultraviolet absorbent, a plasticizer, a leveling agent, a dispersant, etc., after which the mixture is applied to the substrate 1, followed by drying. The above-mentioned mixture can be applied to the substrate 1 by conventional coating process such as gravure coating, bar coating, and screen coating. When the resulting film is dried, organic crystalline microparticles are formed as a transparent microparticle. It is also desired that the crystal core agent and the antioxidant have a group capable of forming a hydrogen bond.

In the method for forming the reflection layer mentioned above, the following process can be selected alternatively. First, organic crystalline microparticles are previously formed, after which the resulting organic crystalline microparticles, colored particles and the like are dispersed in a solvent in which the organic crystalline microparticles are insoluble. Then, the resulting solution is applied to the substrate 1.

Figure 3:
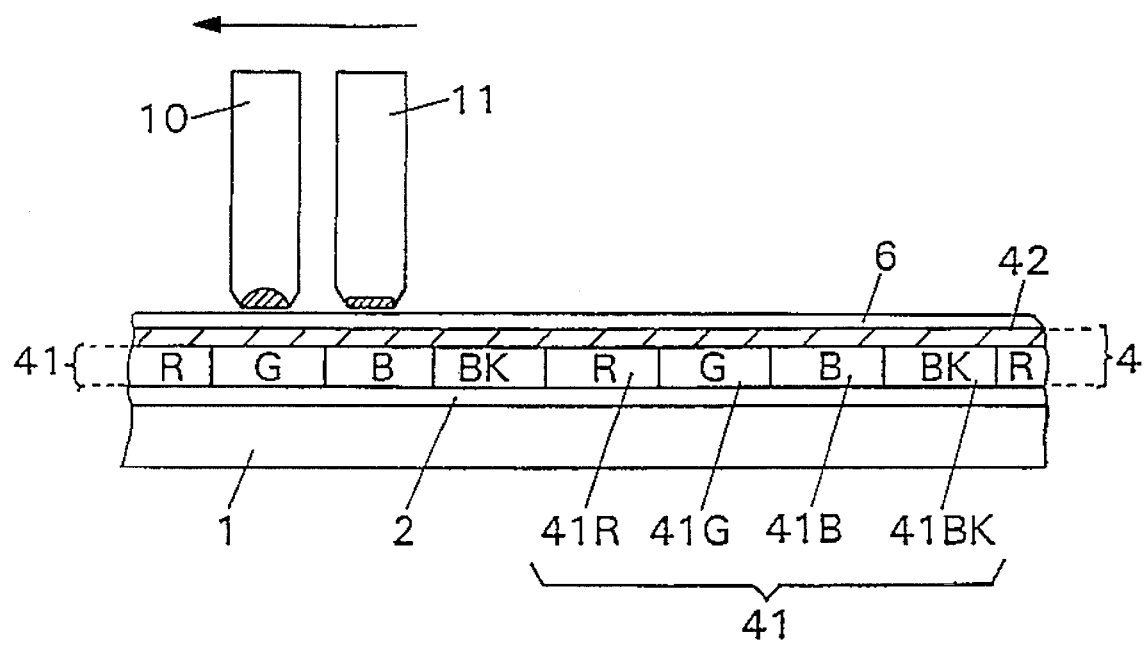
FIG. 3 is a sectional view schematically showing a process for recording information in a rewritable recording medium according to the present invention by the use of a thermal recording head, the recording medium comprising an optical reflection layer, an optical absorption layer, and a recording layer sequentially stacked on a substrate

Another type of the first reversible thermosensitive recording medium is the recording medium as shown in FIG. 3, wherein a plurality of colored segments 41 are formed along the top surface of the reflection layer 2 to form a coloring layer, and a layer of thermosensitive recording matrix is stacked on the coloring layer to form a recording layer. This type of recording medium can be obtained in the following manner. First, a substrate 1 with a reflection layer 2 formed thereon is prepared in the same manner as in the case of the recording medium including the thermosensitive recording matrix end colored particles dispersed therein. Then, colored segments are arranged on the reflection layer 2 in a desired configuration, for example, in stripes, in mosaic, or in dot matrix, to form a coloring layer. For example, as shown in FIG. 3, red segments 41R, green segments 41G, blue segments 41B, and black segments 41BK are arranged in parallel with each other in a prescribed order to form striped coloring layer 41. A recording layer 42 made of a thermosensitive recording matrix is formed on the surface of the coloring layer 41, if required, on which a protection layer 6 is formed. The recording layer 42 can be, for example, a matrix including a transparent matrix polymer and organic crystalline microparticles. The coloring layer 41 and the recording layer 42 are integrated to form an optically selective absorption layer 4.

A second reversible thermosensitive recording medium according to the present invention is a medium having an optical absorption layer as shown in FIGS. 4, 5, 6, and 7. This medium has an optical absorption layer and an optically selective absorption layer sequentially stacked on a substrate. The optically selective absorption layer includes a plurality of colored segments and a thermosensitive recording matrix in contact therewith. The thermosensitive recording matrix is formed so as to cover the colored segments, and so as to be in contact with the optical absorption layer.

Figure 4:
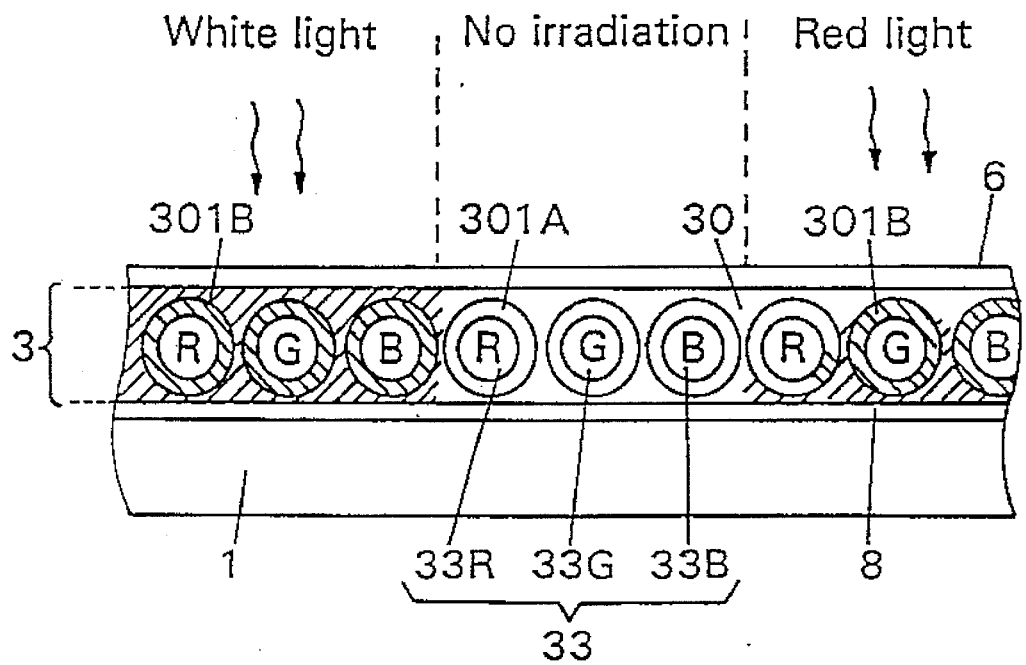
FIG. 4 is a sectional view schematically showing an example of a rewritable recording medium according to the present invention, which comprises an optical absorption layer and an optically selective absorption layer sequentially stacked on a substrate.
Figure 5:
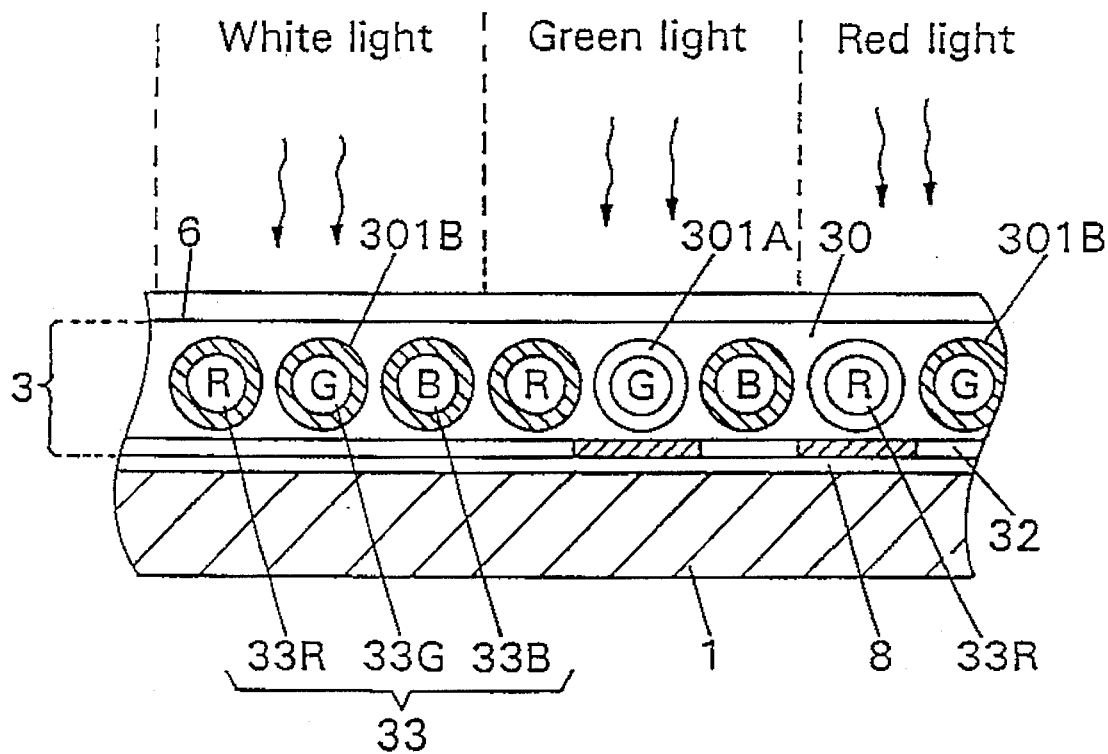
FIG. 5 is a sectional view schematically showing an example of a rewritable recording medium according to the present invention, which comprises an optical absorption layer, a recording layer, and an optically selective absorption layer sequentially stacked on a substrate.

This recording medium is also roughly classified into two types. One is a recording medium wherein a plurality of colored particles 33R, 33G, and 33B are arranged substantially in a single layer as a colored segment in a thermosensitive recording matrix 30 forming an optically selective absorption layer 3 as shown in FIGS. 4 and 5. The recording medium as shown in FIG. 4 can be obtained by sequentially stacking an optical absorption layer 8, an optically selective absorption layer 3 including colored particles 33R, 33G, and 33B, and a protection layer 6 on a substrate 1. The optical absorption layer 8 may have any hues which absorb the light transmitted through the colored segment 33 (in this case, colored particles) in the optically selective absorption layer 3, but generally, colored in black. For example, the optical absorption layer 8 can be formed by applying paint containing carbon black to a substrate.

As described above, the optically selective absorption layer can be formed in the following manner. For example, first, a transparent matrix polymer, a compound capable of forming organic crystalline microparticles, and colored particles are mixed together in a solvent. Then, the mixture is applied to a substrate. For monochrome recording, the colored particles may be in a prescribed monochrome color, while for multicolor recording, it is necessary that the colored particles are arranged substantially in a single layer as described above. Such an optically selective absorption layer including colored particles in a single layer can be formed by utilizing a technology such as a lithography process, a precision printing process, or an electrophotographic process. When multicolor recording is performed, particles colored in a desired color may be arranged. Especially, the use of particles in red, green, and blue colors, or three primary colors of light, respectively, (shown as 33R, 33G, and 33B, respectively, in FIG. 4) enables recording in a desired color.

The recording medium as shown in FIG. 5 has almost the same structure as that of the recording medium as shown in FIG. 4, and the optically selective absorption layer 3 further includes a recording layer 32, which is formed at the interface between the optical absorption layer 8 and the optically selective absorption layer 3. This recording layer 32 is made of a thermosensitive recording matrix, and for example, is formed with a composition including a transparent matrix polymer and organic crystalline microparticles. This recording layer 32 is provided for increasing contrast when information is recorded.

Figure 6:
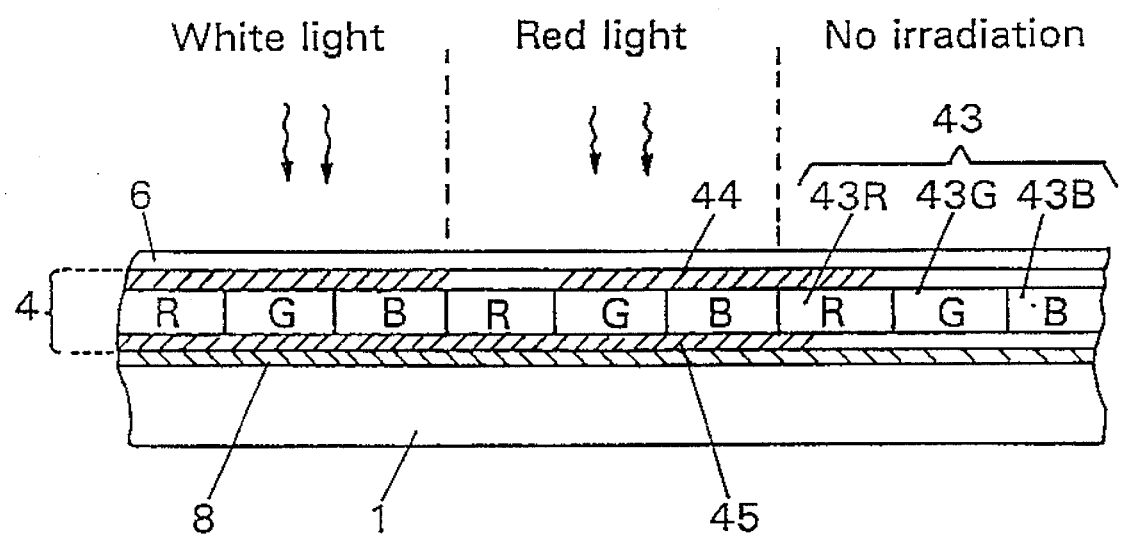
FIG. 6 is a sectional view schematically showing an example of a rewritable recording medium according to the present invention, which comprises an optical absorption layer, a second recording layer, a coloring layer, and a first recording layer sequentially stacked on a substrate.

Another type of the second reversible thermosensitive recording medium is a recording medium as shown in FIG. 6. This type of recording medium is formed in the following manner. First, an optical absorption layer 8 is formed on a substrate 1, on which a second recording layer 45 made of a thermosensitive recording matrix is formed. Then, a coloring layer 43 including a plurality of colored segments 43R, 43G, and 43B arranged in a prescribed configuration, a first recording layer 44 made of a thermosensitive recording matrix, and, if required, a protection layer 6 are sequentially formed thereon. The first recording layer 44, a coloring layer 43, and a second recording layer 45 are integrated to form an optically selective absorption layer 4.

A recording medium of the same type as that shown in FIG. 5 can be prepared by stacking each layer in the same manner as in the case of the recording medium as shown in FIG. 3 of the first recording media. For example, first, an optical absorption layer 8, and a second recording layer 45 made of a thermosensitive recording matrix (e.g., a composition having a transparent matrix polymer and organic crystalline microparticles dispersed therein) are sequentially stacked on a substrate 1. Then, colored segments are arranged thereon in a desired configuration, for example, in stripes, in mosaic, or in dot matrix to form a coloring layer. For example, as shown in FIG. 6, red segments 43R, green segments 43G, and blue segments 43B are formed in parallel with each other to form a striped coloring layer 43. A first recording layer 44 made of a thermosensitive recording matrix in the same manner as in the second recording layer 45 is formed on the coloring layer 43, and further, if required, a protection layer 6 is formed thereon.

Information is recorded in the recording medium and the recoded information is erased from the recording medium in the following manner according to the present invention.

A process for recording information in the recording medium and erasing the recorded information will now be described. As described above, the thermosensitive recording matrix changes in light transmittance by application of heat. For example, assuming that a sheet is made of a composition having a transparent matrix polymer and organic crystalline microparticles dispersed therein, when these organic crystalline microparticles are in a polycrystalline state, the microparticles scatter light, and thus this sheet is opaque as a whole (the condition as shown in FIG. 8b; the reference numeral 310 denotes the transparent matrix polymer, and the reference numeral 311B denotes the organic crystalline microparticles in a polycrystalline state). As shown in FIG. 9, when this sheet is gradually heated and the temperature exceeds $T_0$ (with $T_0$ almost corresponding to a glass transition point (Tg) of the transparent matrix polymer), the sheet begins to change from an opaque state to a transparent state; and when the temperature reaches $T_1$, the sheet becomes almost completely transparent. At this point, the organic crystalline microparticles are light transmissible (shown in FIG. 8a; the organic crystalline microparticles in a single crystalline state are referred to as the reference numeral 311A). When the temperature is further raised to $T_2$ or more, the light transmittance of the organic crystalline microparticles gradually decreases, and the sheet becomes semi-transparent at $T_3$ ($T_3$ approximately corresponding to the melting point of the organic crystalline microparticles). When the organic crystalline microparticles heated to a temperature between $T_1$ and $T_2$ are cooled to room temperature, the organic crystalline microparticles are light transmissible, and therefore the sheet remains transparent. When the organic crystalline microparticles heated to $T_3$ or more are cooled to room temperature, the organic crystalline microparticles scatter light, and therefore the sheet becomes opaque.

Thus, when this thermosensitive recording matrix is once heated to a temperature in the range of $T_1$ to $T_2$ (hereinafter, this heating process is referred to as a heating process in "the low temperature mode"), and then cooled to room temperature, the matrix becomes light transmissible. On the other hand, when the matrix is once heated to a temperature of $T_3$ or more (hereinafter, this heating process is referred to as a heating process in "the high temperature mode"), and then, cooled to room temperature, the matrix comes to scatter light. The cause for this phenomena has been elucidated yet, but it is considered to be as follows. When the organic crystalline microparticles are heated in the high temperature mode, and then cooled, the temperature is rapidly decreased, and therefore, the microparticles become to be in a polycrystalline state after being Supercooled. In contrast, when the microparticles are heated in the low temperature mode, and then cooled, the temperature is relatively slowly decreased, and therefore, they become to be transparent because the heating (i.e., sintering) of the crystal boundaries.

A thermosensitive recording matrix made of such a composition having a transparent matrix polymer and organic crystalline microparticles therein is now described below as an example of the thermosensitive recording matrix, but it is obvious for those skilled in the art that any other thermosensitive recording matrixes can be used which become light transmissible or come to scatter light based on the applied temperature.

Figure 2A:
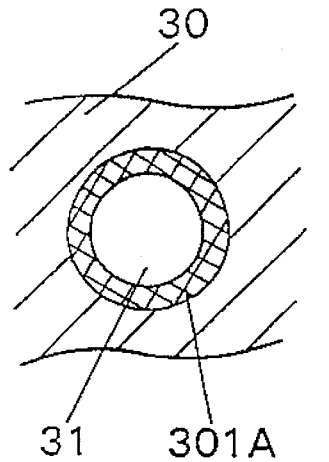
FIGS. 2a and 2b schematically Show the change of crystalline states of organic crystalline microparticles close the surface of a colored particle in a thermosensitive recording matrix. The crystalline states are interconverted in a reversible manner in accordance with the change in temperature of the colored particles in the thermosensitive recording matrix.
Figure 2B:
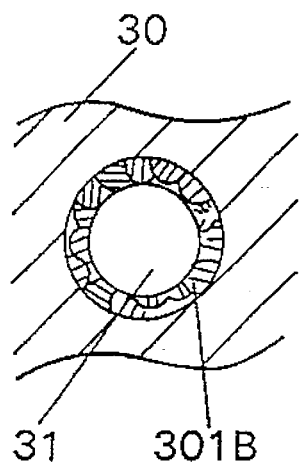

The first recording medium as shown in FIG. 1a is heated in the low temperature mode, and cooled, which makes the thermosensitive recording matrix 30 in the optically selective absorption layer 3 light transmissible. This state is made an initial state. In the initial state, for example, when the colored particles 31 are red, the recording medium appears to be colored in red as a whole as seen from the medium surface (on the protection layer 6 side) because of the presence of the colored particles 31 in the transparent recording matrix 30. Then, when the recording medium is irradiated with light which can be absorbed by the colored particles 31 (in this case, red light), and which has a prescribed amount of energy or more, the colored particles 31 absorb this light to generate heat. Thus, the organic crystalline microparticles in the recording matrix 30 close to the colored particles 31 is heated in the high temperature mode, resulting in crystalline state, and therefore the recording matrix 30 comes to scatter light. That is, the matrix close to the colored particles 31 changes from a state 301A in which the matrix is light transmissible into a state 301B in which the matrix scatters light as shown in FIGS. 2a and 2b. As a result, the colored particles 31 are masked, and the corresponding portions of the recording medium appear to be colored in white. In this way, information is recorded in white on a red ground. The recorded information is erased by heating the recording medium in the low temperature mode and cooling it. The degree of the light scatterability (opacity) of the matrix 30 can be regulated by appropriately adjusting the temperature range which the heating process in the high temperature mode covers. This enables the recording with different masking degrees, and therefore, halftone recording can also be performed. This is also true of the cases where any recording media according to the present invention mentioned below are employed.

With the recording medium of the same type as shown in FIG. 1b, information can be recorded and erased in the same manner as in the case of the recording medium as shown in FIG. 1a. In this type of recording medium in which colored particles are arranged substantially in a single layer in an optically selective absorption layer 3, multicolor recording can be performed. For example, in the medium including red colored particles 31R, green colored particles 31G, and blue colored particles 31B substantially in a single layer in an optical selective absorption layer, first, the optical selective absorption layer is made transparent to be initialized (the medium becomes white as a whole). Then, when the initialized medium is irradiated with red light with a prescribed amount of energy or more, the red colored particles 31R transmit the light, while the green particles 31G and the blue particles 31B absorb the red light to generate heat. Thus, the recording matrix 30 around the green and blue particles 31G and 31B is heated in the high temperature mode. As a result, the heated matrix 30 comes to scatter light, and the opacified matrix masks the blue and green colored particles 31B and 31G. Therefore, the corresponding portions of the recording medium appear to be colored in white. In this way, information is recorded in red on a white ground. Likewise, when the recording medium is irradiated with green light having a prescribed amount of energy or more, information is recorded in green. The recorded information can be erased by irradiating the medium with such light as to heat the medium in the low temperature mode, or heating the medium in the low temperature mode.

With the recording medium wherein a plurality of colored segments are integrated to form a coloring layer as shown in FIG. 3, recording can be performed in the same manner as described above. When the initialized recording medium is irradiated with red light having a prescribed amount of energy or more, the red light passes through red segments 41R, but is absorbed by the other colored segments 41G, 41B, 41BK (BK denotes black colored segment) in the same manner as mentioned above. As a result, the colored segments 41G, 41B, and 41BK generate heat, which heats the corresponding portions of the recording layer 42 thereon in the high temperature mode. This causes the portions, of the recording layer 42, in contact with the colored segments 41G, 41B, and 41BK to scatter light, so that the opacified portions of the recording layer 42 mask the corresponding segments 41G, 41B, and 41BK thereunder. In this way, only light which has passed through the red colored segments 41R is reflected by the reflection layer 2 so that information is recorded in red as a whole. When the recording medium is irradiated with light of the other colors, recording is performed on the same principles.

As shown in FIGS. 1a, 1b, and 3, information can also be recorded in the recording medium by application of heat in place of the irradiation with light mentioned above. For example, information can be recorded in the recording medium with application of heat as shown in FIG. 3 in the following manner. First, the recording layer 42 of this recording medium is heated in the low temperature mode to initialize the medium. The recording medium appears to be colored in light gray in the initial state. Then, the color and position of each colored segment of the coloring layer 41 are detected by means of a photodetecting head 10. A thermal recording head 11 is controlled in response to the detected signal and information on an image to be recorded so that the thermal recording head 11 is located on the recording layer 42, corresponding to the prescribed segment, thereby heating the portion. This causes the heated portion of the recording layer 42 to scatter light, so that the opacified potion of the recording layer masks the desired segment thereunder. In this way, recording is performed. When information is required to be recorded in black, the portions, of the recording layer, in contact with red, green, end blue segments are caused to scatter light, so that the opacified portions of the recording layer mask these segments thereunder, leaving only the portions, of the recording layer, in contact with black segments transparent. Alternatively, by the use of laser beam in place of the thermal recording head 11, recording can be performed by irradiating the desired segment with the laser beam, and causing the segment to generate heat. These recording processes are suitable for a recording sheet for a facsimile, a printer, a digital copying machine, etc.

The method of recording information in the second recording medium including an optical absorption layer according to the present invention will now be described below. First, recording media in which colored particles are contained in an optically selective absorption layer as shown in FIGS. 4 and 5 will be described. For example, the optically selective absorption layer 3 in the recording medium as shown in FIG. 4 is heated in the low temperature mode so as to be light transmissible (to be initialized). In this initial state, transparent colored particles 33R, 33G, and 33B exhibit each color, respectively, but the light passed through each colored segment is absorbed by the optical absorption layer 8 thereunder so that the recording medium appears to be colored in black as seen from the side of protection layer 6. When the recording medium in this state is irradiated with light having a desired wavelength as shown in FIG. 4, the red, green, and blue colored particles 33R, 33G, and 33B absorb light having wavelengths other than those of their transmitted light, respectively, to generate heat. For example, as shown in FIG. 4, when the recording medium is irradiated with red light, the red particles 33R transmit this red light, while the green and blue colored particles 33G and 33B absorb this light, respectively. The light passed through the red particles 33R is absorbed by the portions of the optical absorption layer 8 thereunder, so that the portions generate heat. As a result, the portions of, the thermosensitive recording matrix, in contact with the heated portions of the optical absorption layer 8 are heated in the high temperature mode and become opaque, so that the red light passed through the red particles 33R is reflected by the opacified portions of the thermosensitive recording matrix. Thus, the red particles 33R appear to be colored in red. On the other hand, the green particles 33G and blue particles 33B absorb the red light to generate heat. As a result, the portions of the matrix around the green particles 33G and blue particles 33B are heated in the high temperature mode and become opaque, so That the opacified portions of the matrix mask the corresponding blue and green particles 33B and 33G. Consequently, only the portions of, the recording medium, which have been irradiated with red light, become red, and thus information is recorded in red. Similarly, when the recording medium is irradiated with green or blue light (each of the light has such a prescribed energy as to allow for heating in the high temperature mode), information is recorded in green or blue. When the recording medium is irradiated with white light, since all the colored particles generate heat, the recording medium becomes white. When the recording medium is irradiated with light having a smaller amount of energy than a prescribed amount of energy, or, for example, under natural light in a room, since the temperature of the optically selective absorption layer 3 heated by the colored particles or the optical absorption layer does not reach the lowest temperature in the heating process in the high temperature mode, the matrix 30 remains transparent, so that the recording medium exhibits a black hue as a whole. The recorded information can be erased by heating the recording medium in the low temperature mode.

With the recording medium as shown in FIG. 5, information is recorded and erased on the same principles as those in the case of the recording medium as shown in FIG. 4. As described above, the recording medium as shown in FIG. 5 is constructed so that the optically selective absorption layer 3 further includes a recording layer 32 at the interface between the optically selective absorption layer 3 and the optical absorption layer 8. This recording layer 32 is provided for increasing the sensitivity in recording. As shown in FIG. 5, when the prescribed portion of the recording medium is irradiated with red light, the red light passed through the red particles 33R is absorbed by the portions of the optical absorption layer 8 thereunder, which generate heat. Thus, the corresponding portions of the recording layer 32 thereon is heated. When these portions of the recording layer 32 are heated in the high temperature mode, they come to scatter light. Therefore, the red colored particles 33R exhibit a red hue, while the other colored particles 33G and 33B are masked in the same manner as in the case as shown in FIG. 4. In this way, information is recorded in red. Information can be recorded in each color in the same manner as in the case as shown in FIG. 4. The recorded information can be erased by heating the recording medium in the low temperature mode.

In FIGS. 4 and 5, three primary colored particles 33R, 33G, and 33B are used as colored particles, but when particles in monochrome color or a plurality of colors (multicolor) are used, monochrome recording or multicolor recording can be performed on the same principles, respectively. When information is recorded in monochrome color, or is not required to be recorded in black, colored particles are not necessarily transparent. When the substrate 1 can absorb light of a desired wavelength, or when information is not required to be recorded in black, the optically selective absorption layer 4 may be formed directly on the substrate 1 without the optical absorption layer 8 interposed therebetween.

With the recording medium wherein a plurality of segments are integrated to form a coloring layer 43 as shown in FIG. 6 of the second recording medium, information can be recorded and erased in a similar manner.

For example, first, the recording medium is heated in the low temperature mode to make a first recording layer 44 and a second recording layer 45 light transmissible. Thus, the recording medium is initialized. In this initial state, light having a smaller amount of energy than a prescribed amount of energy passes through the colored segments, and is absorbed by the optical absorption layer 8. Therefore, the recording medium exhibits a black hue. When the prescribed portion of the recording medium is irradiated with, for example, red light with a proscribed amount of energy or more, the red light is transmitted by the red segments 43R, and absorbed by the portions of the optical absorption layer 8 under the red segments 43R. Then, the portions of the optical absorption layer 8 generate heat, which heats the corresponding portions of the second recording layer 45 in the high temperature mode. This causes the portions of the second recording layer 45 to scatter light, so that the red segments 43R appear to be colored in red. On the other hand, the other colored segments 43G and 43B absorb the red light to generate heat, and therefore, the corresponding portions of the first and second recording layers 44 and 45 come to scatter light, which masks the green and blue segments 43G and 43B. In this way, information is recorded in red in the portions of the recording medium which have been irradiated with red light. Information can be recorded in the same manner by irradiating the recording medium with light of a prescribed wavelength (a prescribed color). The recorded information can be erased by heating the recording medium in the low temperature mode. This type of recording medium can be applied to a rewritable color copying machine and an overhead projector (OHP).

Figure 7:
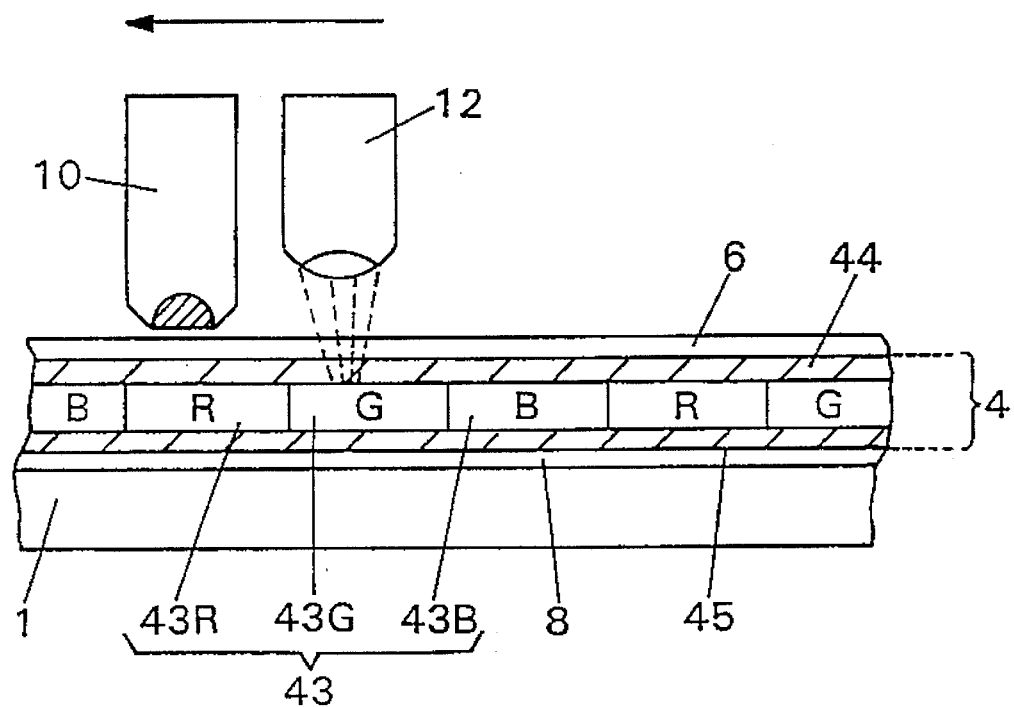
FIG. 7 is a sectional view showing a process for recording information in the rewritable recording medium according to the present invention by the use of laser beam, the recording medium comprising an optical absorption layer, and an optically selective absorption layer sequentially stacked on a substrate.

With the second recording medium according to the present invention, information can also be recorded by application of heat instead of irradiation with light. For example, as shown in FIG. 7, first, the first recording layer 44 and the second recording layer 45 in the recording medium of the same type as shown in FIG. 6 are heated in the low temperature mode to initialize the recording medium. The recording medium in this initial state appears to be colored in black as seen from the side of the surface protection layer 6 in the same manner as An FIG. 5. Each color and position of the colored segments 43R, 43G, and 43B in the coloring layer 43 of the recording medium in the initial state are detected by a photodetecting head 10. Then, the recording medium is irradiated with a laser beam from a laser device 12 in response to the detected signal and information on an image to be recorded to generate heat, which heats a prescribed colored segment in the high temperature mode. Then, the heated segment in the medium is cooled. This causes the first recording layer 44 and the second recording layer 45 to become opaque and scatter light, so that the opacified portions of the first and second recording layers 44 and 45 mask the corresponding colored segments, thus completing recording. In this way, information can be recorded in desired multicolors. In this process, since the recording medium in the initial state has a black background, it is relatively difficult to detect the color of each segment by the photodetecting head 10. Therefore, for example, the colored segments are formed in a prescribed pattern in order to facilitate the detection of each segment by the photodetecting head 10, or the position of each colored segment is previously stored in the photodetecting head 10. Many attempts as mentioned above allow for the easy detection of the color and position of each segment.

Alternatively, in the process of initializing the recording medium, the focus and the irradiation temperature of the laser device 12 can be adjusted to make only the first recording layer 44 light transmissible and to cause the second recording layer 45 to scatter light. This allows for the easy detection of the color and position of each segment by the photodetecting head 10. In this initial state, the recording medium appears to be colored in white as seen from the side of the surface protection layer 6. The color and position of each segment in the recording medium in the initial state are detected by means of the photodetecting head 10, while the portion of the first recording layer 44 on the segment which has an unnecessary color for an image to be recorded is heated in the high temperature mode by means of the laser device 12 so as to scatter light. Thus, the opacified portion of the first recording layer 44 masks the corresponding segment having the unnecessary color thereunder to perform recording. When information is required to be recorded in black, the first and second recording layers corresponding to the portion to be recorded in black are heated in the low temperature mode by means of the laser device 12 to make the portions light transmissible. As a result, when the recording medium is irradiated with light, the light passes through the light transmissible portion of the first and second recording layers and is absorbed by the corresponding portion of the optical absorption layer 8 thereunder, so that the portion appears to be colored in black as seen from the surface protection layer 6 side. In this way, information can be recorded in desired multicolors on a white background.

In the method by the use of the laser device 12 as mentioned above, the difference in temperature between the first recording layer 44 and the second recording layer 45 can be controlled by focusing the laser device 12 on either of these layers 44 and 45. This method of recording can be applied to a recording sheet for a facsimile, a printer, a digital copying machine, and the like in the same manner as in the above-mentioned method as shown in FIG. 3. With the second recording medium, information can be recorded and erased by a thermal means, for example, a thermal recording head.

With the first and second recording medium according to the present invention, recording by a thermal means is generally employed in monochrome recording. However, if a prescribed portion of the colored segment can be heated in the high temperature mode, multicolor recording can be performed by a thermal means. In some cases, the recording medium is heated, for example, by a thermal roller so as to be initialized, or erase the recorded information.

Thus, with the rewritable recording medium according to the present invention, information can be recorded and erased by means of various light sources, heat sources, or a laser beam. The recording medium can be used as recording media for an optical disk, a printer, and a facsimile, and further used as a recording medium for a color copying machine.

According to the method of recording of the present invention, rewritable recording can be performed. Further, the degree of opacity can be controlled depending upon the degree of heating the medium in the high temperature mode, which enables recording with different masking degrees, and therefore, halftone recording can be performed. In this way, according to the present invention, information can be recorded in a medium having a simplified structure in a rewritable manner, and further, multicolor recording can be readily performed.

EXAMPLES

Hereinafter, the present invention will be described by way of illustrating examples.

Example 1

First, 4 g of hydroxystearic acid as a compound pound capable of forming an organic crystalline microparticle of a recording material, 0.1 g of a phenol type antioxidant as an additive, and 10 g of partially saponified vinyl chloride-vinyl acetate copolymer having a hydroxyl group were dissolved in 100 ml of tetrahydrofuran, after which 7 g of red glass beads with a mean grain size of 15 μm were dispersed as colored particles in the resulting solution. The dispersion thus obtained was coated, by gravure coating, onto a reflection layer 2 formed by vapor deposition of aluminum on a polyester sheet (substrate 1) with a thickness of 0.2 mm and dried, thereby forming an optically selective absorption layer 3 with a thickness of 13 μm. Then, a UV-curable acrylic resin prepolymer was coated on the optically selective absorption layer 3 by bar coating to a thickness of 20 μm. After that, the prepolymer was irradiated with ultraviolet rays to be cured, whereby a protection layer 6 with abrasion resistance was formed (see FIG. 1*a*). Thus, a rewritable thermosensitive recording medium was obtained. Information was recorded and erased in the resulting thermosensitive recording medium by means of a semiconductor laser device in the following manner. The temperature range in which the thermosensitive recording matrix in the optically selective absorption layer 3 of this recording medium was transparent was in the range of about 70° to 90° C. The optically selective absorption layer of the recording medium was once heated in this temperature range to be made transparent, and then cooled to room temperature. Thus, this recording medium was initialized to be colored in red. The recording medium in this initial state was supplied with energy by a semiconductor laser device to be heated to a temperature of 100° C., and cooled, so that the optically selective absorption layer 3 was opacified. In this way, recording was completed. The recorded information was erased by heating this medium to a temperature of 80° C. again and then cooling it.

The opaque region of the recording medium where information was recorded, and the transparent region of the recording medium where information was erased, were analyzed by X-ray diffraction, and the diffraction peaks were observed in both of the regions. It was found that in both of the regions, crystalline microparticles were present. It was found that the areas close to colored particles in the region where information was recorded was opaque, where the organic crystalline microparticles were in a polycrystalline state. In contrast, the areas close to the colored particles 31 where recorded information was erased was transparent. When recording was performed, vivid image quality was exhibited. In endurance tests, the recording medium could withstand 600 repetitions of recording.

Example 2

First, 3 g of behenic acid as a compound capable of forming an organic crystalline microparticle of a recording material, 0.1 g of a phenol type antioxidant as an additive, 2 g of an adhesive polyester (Vyron, manufactured by Toyoho Co., Ltd,) as a transparent matrix polymer, and 5 g of polyurethane were dissolved in 100 ml of tetrahydrofuran. Then, 7 g of black conductive magnetite particles having a mean particle size of 20 μm are dispersed as a colored particle in the resulting solution. A substrate 1 made of a polyester sheet with a thickness of 0.2 mm was coated with a white coating material to form a white reflection layer 2. Then, the above-mentioned dispersion was coated onto a white reflection layer 2 by roller coating and dried, thereby forming an optically selective absorption layer 3 with a thickness of 20 μm. Then, a UV-curable acrylic resin prepolymer was coated on the optically selective absorption layer 3 by bar coating to form a protection layer 5 having abrasion resistance and a thickness of 25 μm. After that, the prepolymer was irradiated with ultraviolet rays to be cured, whereby a rewritable recording medium was obtained (see FIG. 1a). Information was recorded and erased in the resulting rewritable recording medium by means of a semiconductor laser device. The temperature range in which the optically selective absorption layer 3 of this recording medium was transparent was in the range of about 90° to 110° C. The optically selective absorption layer 3 of the recording medium was once heated in this temperature range to be made transparent, and then cooled to room temperature. The recording medium was supplied with energy by a semiconductor laser device to be heated to a temperature of 120° C., and cooled, so that the optically selective absorption layer 3 comes to be opacified. In this way, information was vividly recorded in white on a black background, The recorded information was erased by heating this medium to a temperature of 100° C. and cooling it. In endurance tests, the recording medium could withstand 480 repetitions of recording.

Example 3

First, 3 g of behenic acid as a compound capable of forming an organic crystalline microparticle of a recording material, 0.1 g of a phenol type antioxidant as an additive, and 6 g of vinyl chloride-vinyl acetate-acrylamide copolymer as a transparent matrix polymer were dissolved in 100 ml of tetrahydrofuran to form a recording material solution. White paint was applied to a polyester sheet with a thickness of 0.2 mm as a substrate 1 to form a white reflection layer 2 with a thickness of 15 μm. In a separate process, resin solutions containing red, green, blue, and black coloring matters, respectively, were prepared. These resin solutions were applied to the white reflection layer 2 in stripes successively with a pitch of 100 μm by screen printing process to form a coloring layer 41 with a thickness of 5 μm. The recording material solution was applied thereon to form a recording layer 42 with a thickness of 30 μm. Then, a UV-curable acrylic resin prepolymer was coated on the optically selective absorption layer 4 by bar coating to form a protection layer 6 with a thickness of 25 μm. After that, the prepolymer was irradiated with ultraviolet rays to be cured, whereby a rewritable recording medium was obtained (see FIG. 3). The temperature range in which the optically selective absorption layer 4 of this rewritable color recording medium was transparent was in the range of about 80° to 90° C. The surface of the recording medium was applied with a heat roller of 90° C. to be heated in the low temperature mode and cooled. This makes the recording layer 42 transparent to initialize the recording medium. The color and position of the coloring layer 41 of the initialized recording medium were detected by means of a photodetecting head 10. A thermal recording head 11 was caused to develop heat of 130° C. in the high temperature mode in response to the detected signal and a color image signal. Then, the portion of the recording layer 42 corresponding to the segment at a prescribed position was heated by the thermal recording head 11 to be opacified, providing a vivid color recording image. In endurance tests, the recording medium could withstand 110 repetitions of recording.

Example 4

First, 4 g of hydroxystearic acid as a compound capable of forming an organic crystalline microparticle of a recording material, 0.1 g of a hindered phenol type antioxidant as an additive, and 6 g of vinyl chloride-vinyl acetate-acrylamide copolymer as a transparent matrix polymer were dissolved in 100 ml of tetrahydrofuran to form a recording material solution. As a colored particle 33, 4 g of melamine resin particles colored in red, green, and blue (33R, 33G, and 33B, respectively) with a mean particle size of 20 μm were dispersed in the recording material solution. Paint containing carbon black was applied to a polyester sheet with a thickness of 0.2 mm as a substrate 1 to form a black optical absorption layer 8 with a thickness of 15 μm. The dispersions were coated on the black optical absorption layer 8 by blade coating to form an optically selective absorption layer 3 with a thickness of 35 μm. Then, a UV-curable acrylic resin prepolymer was coated on the optically selective absorption layer 3 by bar coating to form a protection layer 6 with a thickness of 20 μm. After that, the prepolymer was irradiated with ultraviolet rays to be cured, whereby a rewritable recording medium was obtained (see FIG. 4). The resulting recording medium was irradiated with light corresponding to a color image to be recorded, and recording was performed in the following manner. The temperature range in which the optically selective absorption layer 3 of this rewritable color recording medium was transparent was in the range of about 70° to 90° C. The optically selective absorption layer 3 of this recording medium was heated in this temperature range to be made transparent, and then cooled to room temperature. This recording medium was provided with energy by a semiconductor laser device to be heated to a temperature of about 110° C., end cooled, so that the optical selective absorption layer 3 was opacified. In this way, a vivid color image was provided. Further, the recording medium was heated to a temperature of about 75° C., and then cooled to be made transparent, after which the medium was irradiated with light corresponding to the color image to form a color image, again. In endurance tests, the recording medium could withstand 270 repetitions of recording.

Example 5

An optical absorption layer 8 was formed on a substrate 1 in the same manner as in Example 4. The same recording material solution as that in Example 4 was applied to the optical absorption layer 8 by blade coating to form a recording layer 32 with a thickness of 10 μm. The same dispersion containing colored particles as in Example 4 was applied to the recording layer 32 by blade coating to form an optically selective absorption layer 3 with a thickness of 25 μm. Then, a UV-curable acrylic resin prepolymer was coated on the optically selective absorption layer 3 by bar coating to form an abrasion resistant protection layer 6 with a thickness of 20 μm. After that, the prepolymer was irradiated with ultraviolet rays to be cured, whereby a rewritable recording medium was obtained (see FIG. 5). The resulting recording medium was irradiated with light corresponding to a color image to be recorded, and recording was performed in the following manner. The temperature range in which the optically selective absorption layer 3 of this rewritable color recording medium was transparent was in the range of about 70 to 90° C. The optically selective absorption layer 3 of this recording medium was heated in this temperature range to be made transparent, and then cooled to room temperature. This recording medium was provided with energy by a semiconductor laser device to be heated to a temperature of about 110° C., and cooled, so that the optically selective absorption layer 3 was opacified. In this way, a vivid color image was provided. Further, the recording medium was heated to a temperature of about 80° C., and then cooled to be made transparent, after which the medium was irradiated with light corresponding to the color image to form a color image, again. In endurance tests, the recording medium could withstand 270 repetitions of recording.

Example 6

In order to form a first recording layer 44 and a second recording layer 45, first, 4 g of hydroxystearic acid as a compound capable of forming an organic crystalline microparticle of a recording material, 0.1 g of a hindered phenol type antioxidant as an additive, and 6 g of vinyl chloride-vinyl acetate acrylamide copolymer as a transparent matrix polymer were dissolved in 100 ml of tetrahydrofuran to form a recording material solution. Paint containing carbon black was coated on a polyester sheet with a thickness of 0.2 mm as a substrate 1 to form a black optical absorption layer 8 with a thickness of 15 μm. The recording material solution was applied to the optical absorption layer 8 by bar-coating to form a second recording layer 45 with a thickness of 30 μm. In a separate process, resin solutions containing red, green, and blue coloring matters, respectively, were prepared. These resin solutions were coated on the second recording layer 45 in stripes successively with a pitch of 150 μm by screen printing process to form a coloring layer 43 with a thickness of 5 μm. The recording material solution was applied to the coloring layer 43 by bar-coating to form a first recording layer 44 with a thickness of 30 μm. Then, a UV-curable acrylic resin prepolymer was coated on the optically selective absorption layer 3 by bar coating to form a protection layer 6 with a thickness of 20 μm. After that, the prepolymer was irradiated with ultraviolet rays to be cured, whereby a rewritable recording medium was obtained (see FIG. 6).

The resulting recording medium was applied with a heat roller of 80° C. to be heated in the low temperature mode and cooled. This made the first recording layer 44 and the second recording layer 45 transparent to initialize the recording medium. The initialized recording medium was irradiated with light corresponding to a color image to be recorded, and recording was performed in the following manner. The temperature range in which the optically selective absorption layer 4 of this rewritable recording medium was transparent was in the range of about 70 to 80° C. The optically selective absorption layer 4 of this recording medium was heated in this temperature range to be made transparent, and then cooled to room temperature. This recording medium was provided with energy by a lamp to be heated to a temperature of about 100° C., and cooled, so that the optically selective absorption layer 4 was opacified. In this way, a vivid color image was provided. Further, the recording medium was heated to a temperature of about 75° C., and then cooled to be made transparent, after which the medium was irradiated with light corresponding to the color image to form a color image, again. In endurance tests, the recording medium could withstand 150 repetitions of recording.

Example 7

Carbon black-filled black coating was applied to a polyester sheet with a thickness of 0.2 μm as a substrate 1 except for the edge portion thereof to form a black optical absorption layer 8 with a thickness of 15 μm. Then, the same type of recording medium as that in Example 6 was constructed (FIG. 7). This uncoated edge portion was used as a reference for detecting each color of the striped segment. The resulting recording medium was applied with a heat roller of 80° C. to be heated in the low temperature mode, and then cooled. This makes the first recording layer 44 and the second recording layer 45 transparent in the same manner as in Example 6 to initialize the recording medium. The color and position of the coloring layer 43 of the initialized recording medium were detected by a photodetecting head 10. A pulse in the high temperature mode was produced by a laser device 12 in response to the detected signals and a color image signal. Thus, the first recording layer 44 was heated and then cooled to be opacified. As a result, the opacified portion masked the corresponding portion of the coloring layer 43. In this way, recording was performed to obtain a vivid color recording image. In endurance tests, the recording medium could withstand 210 repetitions of recording.

Example 8

The recording medium having the same construction as that in Example 6 was applied with a heat roller from the bottom surface to be heated so that the first recording layer 44 was made transparent and the second recording layer 45 was opacified, which was made as an initial state. The color and position of the coloring layer 43 of this initialized recording medium were detected by the photodetecting head 10. Then, the portions of the first recording layer 44 on the segment having unnecessary colors for an image to be recorded were irradiated with a laser beam corresponding to the high temperature mode by the laser device 12. As a result, the opacified portions masked the segments having the unnecessary colors. The portions of the medium required To be colored in black were irradiated with weak pulse corresponding to the low temperature mode to make the second recording layer 45 transparent. This recording medium can be applied to a laser printer.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A rewritable recording medium comprising an optical absorption layer and an optically selective absorption layer sequentially stacked on a substrate, wherein the optically selective absorption layer includes a plurality of colored segments, the colored segments being able to transmit light corresponding to its color, and a reversible thermosensitive recording matrix in contact with the colored segments, the reversible thermosensitive recording matrix being formed so as to cover the colored segments and so as to come in contact with the optical absorption layer, and changing in light transmittance in a reversible manner by application of heat.

2. A rewritable recording medium according to claim 1, wherein the optically selective absorption layer comprises a first recording layer made of the reversible thermosensitive recording matrix, a second recording layer having a top surface and made of the reversible thermosensitive recording matrix formed on the optical absorption layer; a coloring layer including a plurality of colored segments formed on the second recording layer, the colored segments being arranged along the top surface of the second recording layer to form the coloring layer, wherein the first recording layer is formed on the coloring layer.

3. A rewritable recording medium according to claim 2, wherein the colored segments are arranged in parallel with each other to form striped segments so that a plurality of colors corresponding to the striped segments are exhibited in a prescribed order.

4. A rewritable recording medium according to claim 2, wherein the colored segments can transmit light of a prescribed wavelength and absorb light of the other wavelengths to generate heat.

5. A rewritable recording medium according to claim 2, wherein the colored segments exhibit a plurality of hues.

6. A rewritable recording medium according to claim 2, wherein the colored segments are colored in three primary colors which are red, green, and blue, respectively.

7. A rewritable recording medium according to claim wherein the reversible thermosensitive recording matrix is made of a composition comprising organic crystalline microparticles and a transparent matrix polymer.

8. A rewritable recording medium according to claim 7, wherein a compound constituting at least a surface of the colored segments in contact with the first recording layer and the second recording layer, respectively, has a group which can facilitate the formation of a crystal nucleus of the organic crystalline microparticles in the recording matrix.

9. A rewritable recording medium according to claim 8, wherein a compound constituting at least a surface of the colored segments in contact with the first recording layer and the second recording layer, respectively, and a compound constituting the organic crystalline microparticles have a group capable of forming a hydrogen bond.

10. A rewritable recording medium according to claim 9, wherein the organic crystalline microparticles have at least one group selected from the group consisting of a carboxyl group and a hydroxyl group, and have a melting point in the range of 60° to 120° C.

11. A rewritable recording medium according to claim 2, wherein the colored segments are made of glass or a polymer.

12. A rewritable recording medium according to claim 1, further comprising a transparent protection layer on the optically selective absorption layer.

13. A method of recording information in a rewritable recording medium comprising an optical absorption layer and an optically selective absorption layer sequentially laminated on a substrate, wherein the optically selective absorption layer includes colored segments of three primary colors which are red, green, and blue, respectively which can transmit light corresponding to its color, and a reversible thermosensitive recording matrix in contact with the colored segments, the reversible thermosensitive recording matrix being formed so as to cover the colored segments and so as to be in contact with the optical absorption layer, and changing in light transmittance in a reversible manner by application of heat, the method of recording comprising the steps of:

a) heating and cooling the reversible thermosensitive recording matrix in the optically selective absorption layer so that the recording matrix becomes light transmissible, and b) irradiating the colored segments with light corresponding to a color image signal whereby a particular colored segment transmits light corresponding to its color, whereby the optical absorption layer absorbs the light which has passed through the colored segments to generate heat, which causes a change of the reversible thermosensitive recording matrix in contact with the optical absorption layer to scatter light, so that the color of the segments which have transmitted the light appears in these segments; while the colored segments which have absorbed light generate heat, which causes a change of the reversible thermosensitive recording matrix in contact with the segments to scatter light, so that the colors of the segments which have absorbed the light are masked.

14. A method according to claim 13, wherein the optically selective absorption layer comprises a first recording layer made of the reversible thermosensitive recording matrix, a second recording layer having a top surface and made of the reversible thermosensitive recording matrix formed on the optical absorption layer; a coloring layer including a plurality of colored segments formed on the second recording layer, the colored segments being arranged along the top surface of the second recording layer to form the coloring layer, where the first recording layer is formed on the coloring layer, and the color of the colored segments which have transmitted the light appears in these segments by a light reflection of the second recording layer in a light scattering state, while the color of the colored segments absorbing the light are masked by the first recording layer in a light scattering state.

* * * * *

UNITED STATES PATENT AND TRADEMARK OFFICE
CERTIFICATE OF CORRECTION

PATENT NO.   : 5,543,381
DATED        : August 6, 1996
INVENTOR(S)  : Yoshio Kishimoto et al.

Figure 8A:
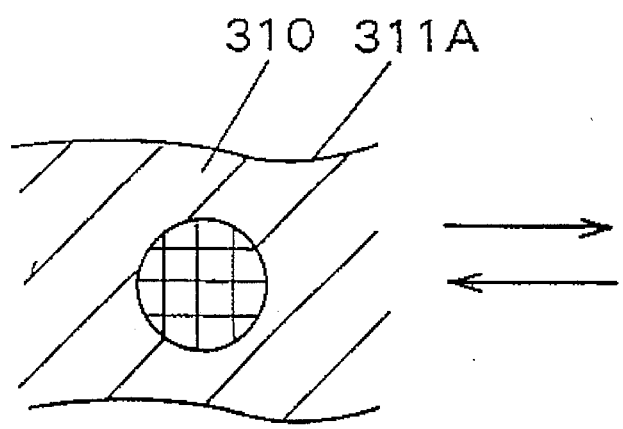
FIGS. 8a and 8b are sectional views schematically showing organic crystalline microparticles in different crystalline states 311A and 311B in a matrix polymer 310.
Figure 8B:
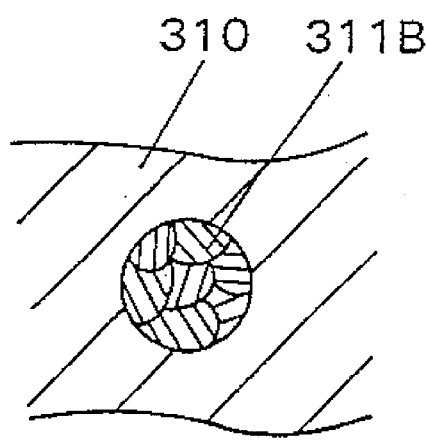
Figure 9:
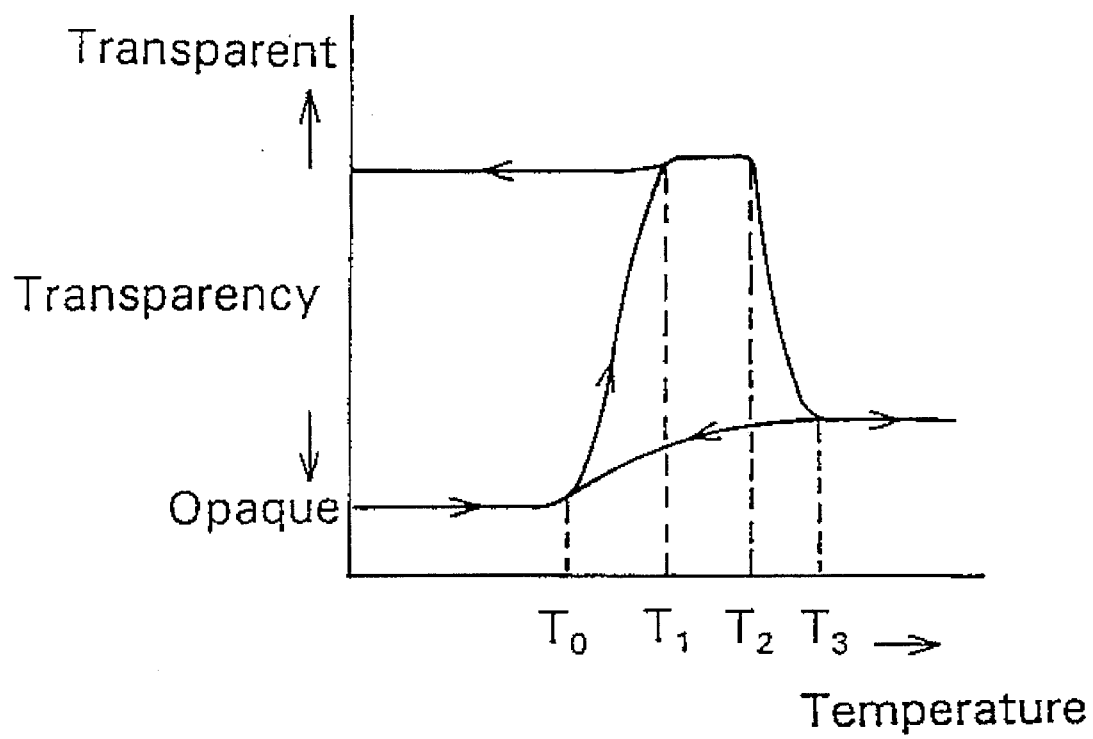
FIG. 9 is a graph showing the relationship between the transparency of a sheet and the temperature of the sheet, the sheet being made of a thermosensitive matrix comprising organic crystalline microparticles and a transparent matrix polymer used in the present invention.
Figure 8A:
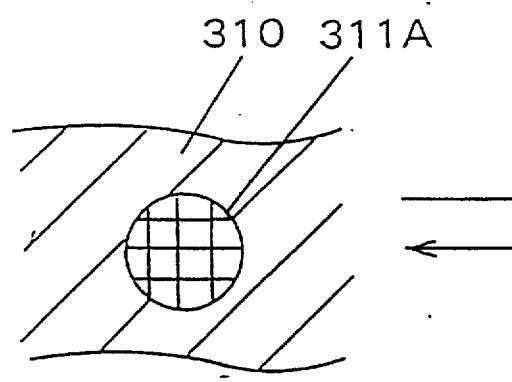
Figure 8B:
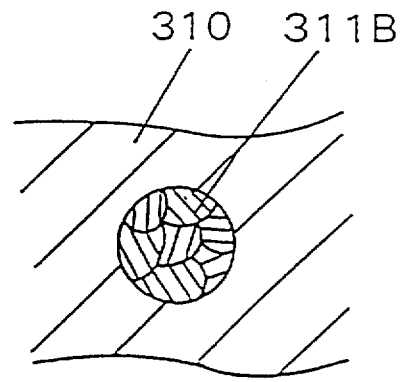
Figure 9:
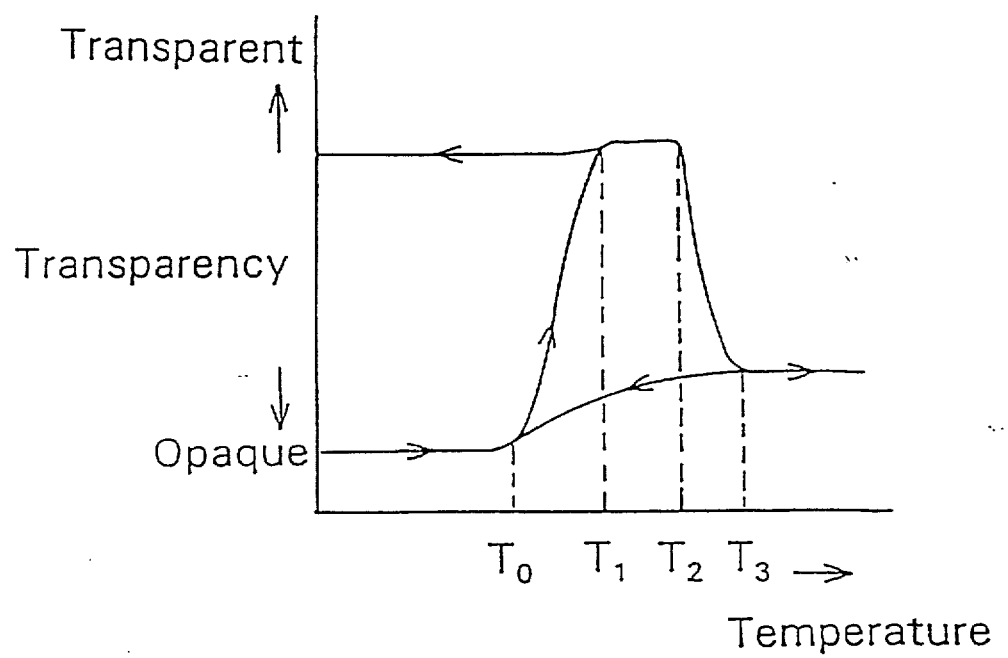
Figure 4:
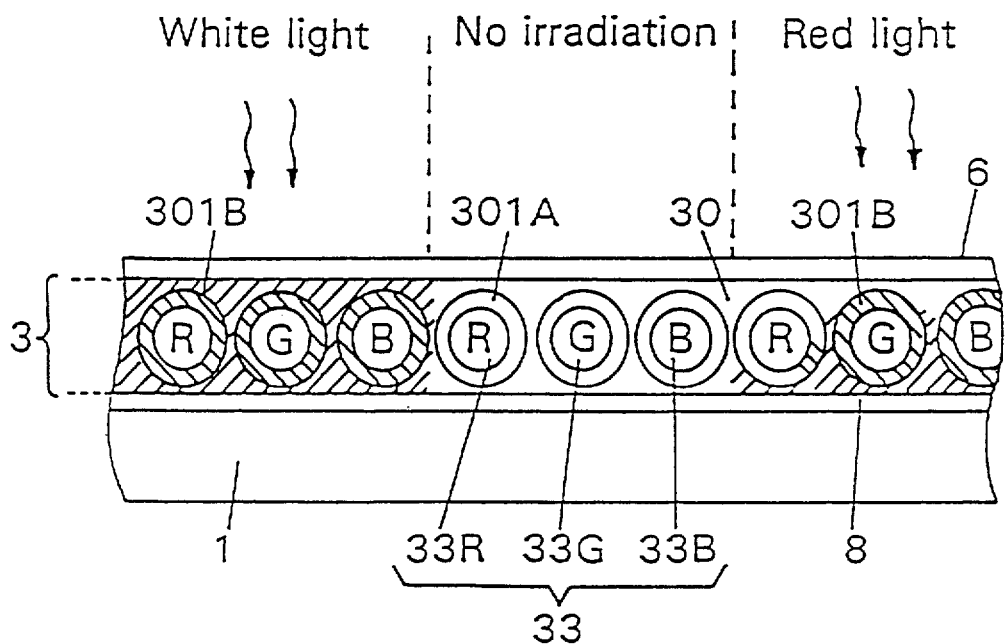
Figure 5:
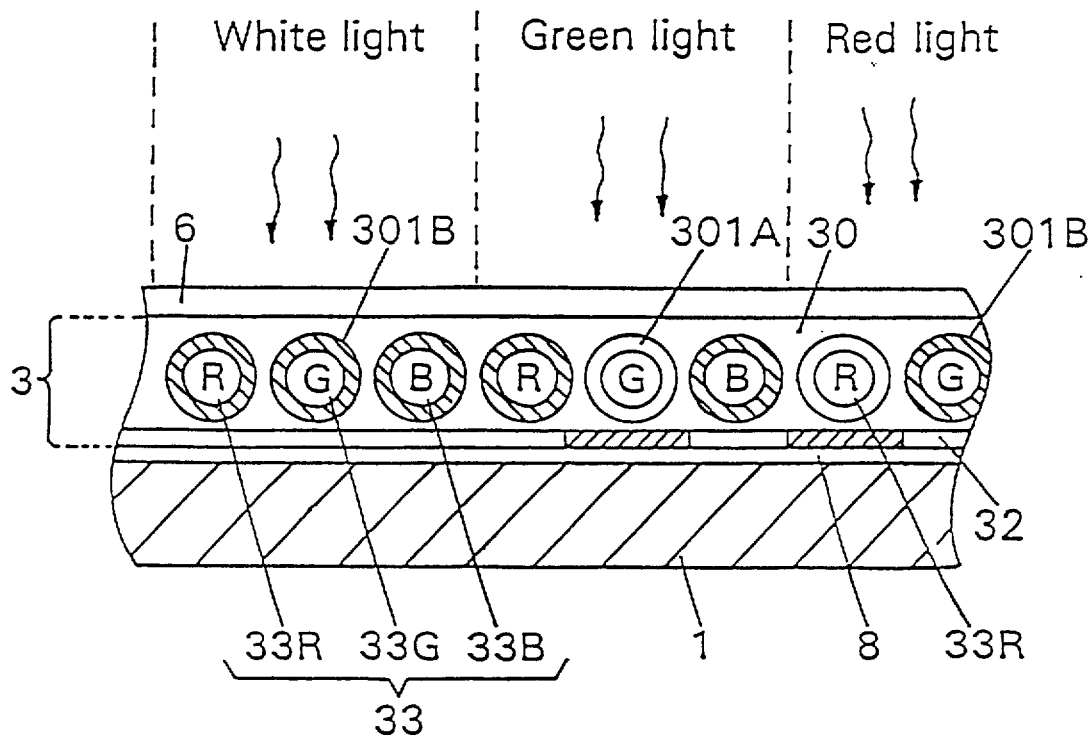
Figure 6:
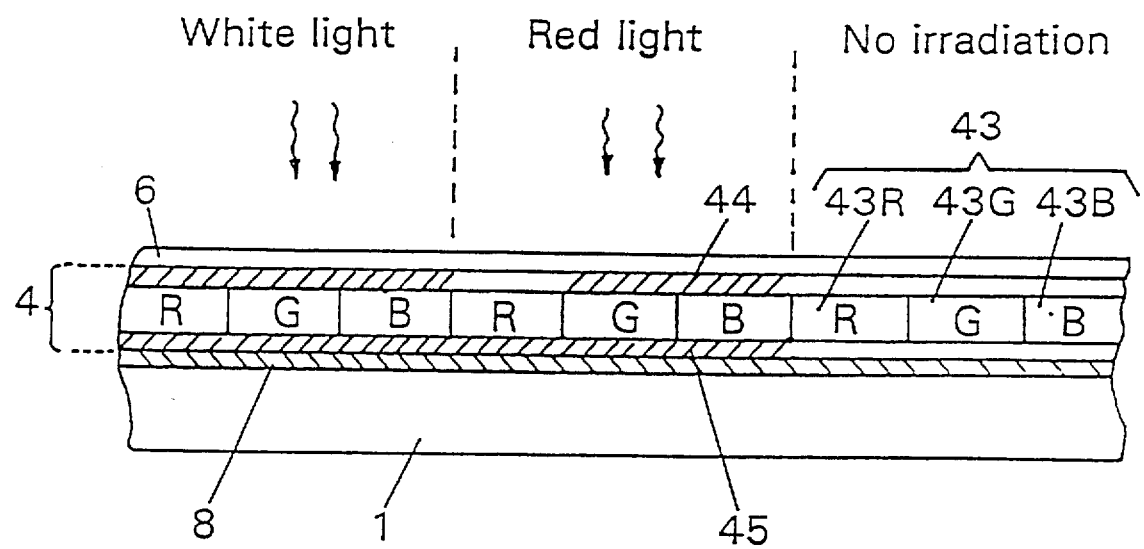
Figure 7:
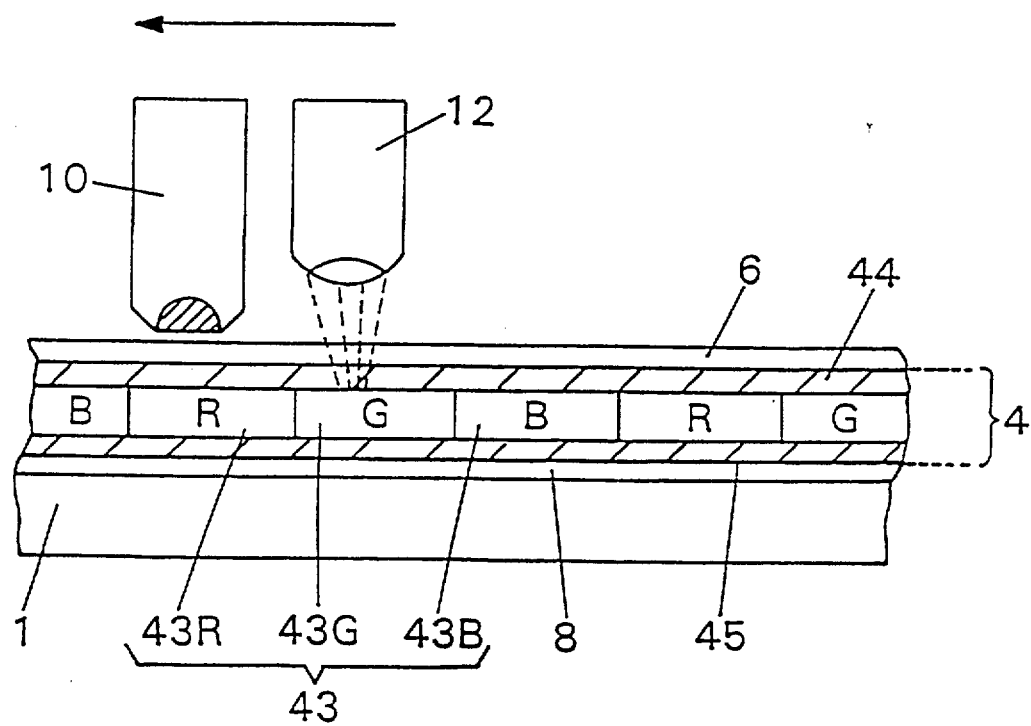

It is certified that error appears in the above-indentified patent and that said Letters Patent is hereby corrected as shown below:

In the drawings, Sheet 5, Fig. 8a, the reference number 311A should be applied to the organic crystalline microparticle in the matrix polymer 310, as shown on the attached page.

Signed and Sealed this

Tenth Day of December, 1996

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,543,381
DATED : August 6, 1996
INVENTOR(S) : Yoshio Kishimoto et al.

It is certified that error appears in the above-indentified patent and that said Letters Patent is hereby corrected as shown below:

In the drawings, sheet 4, Figure 6, and in the cover sheet, please delete the cross-hatching in layer 4 immediately above and below 43R in the no irradiation zone; and in the drawings, sheet 3, Figure 5, the lead line for reference number 6 should be applied to the layer above layer 3, as shown on the attached pages.

Column 2, line 21, "and $T_2$" should read --$T_1$ and $T_2$--.

Column 9, line 30, "i" should read --1--; and column 9, line 60, "(XXb)" should read --(IIb)--.

Column 15, line 61, "FIG. 5" should read --FIG. 6--.

Column 23, line 25, "layer 5" should read --layer 6--.

Claim number 7, line 1 of that claim, "claim" should read --claim 2--.

Signed and Sealed this

Twenty-second Day of July, 1997

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,543,381
DATED : August 6, 1996
INVENTOR(S) : Yoshio Kishimoto et al.

It is certified that error appears in the above-identified patent and that said Letters Patent is hereby corrected as shown below:

In the drawings, sheet 4, Figure 6, and in the cover sheet, please delete the cross-hatching in layer 4 immediately above and below 43R in the no irradiation zone; and in the drawings, sheet 3, Figure 5, the lead line for reference number 6 should be applied to the layer above layer 3, as shown on the attached pages.

Column 2, line 21, "and $T_2$" should read --$T_1$ and $T_2$--.

Column 9, line 30, "i" should read --1--; and column 9, line 60, "(XXb)" should read --(IIb)--.

Column 15, line 61, "FIG. 5" should read --FIG. 6--.

Column 23, line 25, "layer 5" should read --layer 6--.

Claim number 7, line 1 of that claim, "claim" should read --claim 2--.

This certificate supersedes Certificate of Correction issued July 22, 1997

Signed and Sealed this

Sixth Day of January, 1998

*Attest:*

BRUCE LEHMAN

*Attesting Officer*    Commissioner of Patents and Trademarks